United States Patent
Hu et al.

(10) Patent No.: US 11,516,689 B2
(45) Date of Patent: Nov. 29, 2022

(54) CONTROL FOR MOBILITY CHANNEL PREDICTION

(71) Applicant: Samsung Electronics Co., Ltd., Suwon-si (KR)

(72) Inventors: Yeqing Hu, Allen, TX (US); Yang Li, Plano, TX (US); Tiexing Wang, Albany, NY (US); Junmo Sung, Richardson, TX (US); Rui Wang, San Jose, CA (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 17/129,797

(22) Filed: Dec. 21, 2020

(65) Prior Publication Data

US 2021/0219161 A1    Jul. 15, 2021

Related U.S. Application Data

(60) Provisional application No. 63/060,934, filed on Aug. 4, 2020, provisional application No. 62/960,270, filed on Jan. 13, 2020.

(51) Int. Cl.
*H04L 12/00* (2006.01)
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 7,577,190 B2 * | 8/2009 | Denk | H04B 17/373 375/224 |
| 2010/0323632 A1 * | 12/2010 | Okino | H04B 7/0851 455/67.11 |

(Continued)

FOREIGN PATENT DOCUMENTS

| WO | WO-2015047869 A1 * | 4/2015 | ............. H04B 7/024 |
|---|---|---|---|
| WO | 2019001743 A1 | 1/2019 | |
| WO | 2019157230 A1 | 8/2019 | |

OTHER PUBLICATIONS

International Search Report and Written Opinion dated Apr. 15, 2021 regarding Application No. PCT/KR2021/000474, 14 pages.

(Continued)

*Primary Examiner* — Ajit Patel
*Assistant Examiner* — Lionel Preval

(57) ABSTRACT

A method for operating a base station comprises receiving channel information from a plurality of UEs; determining, based on the channel information, one or more UEs on which to base a channel prediction; computing a first set of metrics and a second set of metrics corresponding to the plurality of UEs, wherein computing the first set of metrics has a lower complexity than computing the second set of metrics; performing a selection process on the plurality of UEs based on the first and second set of metrics associated with the plurality of UEs; selecting a first subset of UEs from the plurality of UEs based on a first set of metrics; selecting, from the first subset, a second subset of UEs based on a second set of metrics; and performing the channel prediction based on the second subset of UEs.

20 Claims, 16 Drawing Sheets

(56) References Cited

U.S. PATENT DOCUMENTS

| | | | |
|---|---|---|---|
| 2010/0330923 A1* | 12/2010 | Okino | H04B 7/0413 |
| | | | 455/67.11 |
| 2015/0092573 A1* | 4/2015 | Zhang | H04B 7/024 |
| | | | 370/252 |
| 2015/0304132 A1 | 10/2015 | Cili | |
| 2015/0358063 A1* | 12/2015 | Farkas | H04B 7/024 |
| | | | 375/267 |
| 2017/0272177 A1* | 9/2017 | Seyama | H04B 15/00 |
| 2017/0346580 A1* | 11/2017 | Astrom | H04L 5/006 |
| 2019/0335445 A1 | 10/2019 | Forenza et al. | |
| 2021/0105155 A1 | 4/2021 | Kons et al. | |
| 2021/0321423 A1* | 10/2021 | Kuchi | H04B 7/0689 |

OTHER PUBLICATIONS

Liu et al., "MIMO-OFDM Wireless Channel Prediction by Exploiting Spatial-Temporal Correlation", IEEE Transactions On Wireless Communications, vol. 13, No. 1, Jan. 2014, pp. 310-319.

* cited by examiner

CONTROL FOR MOBILITY CHANNEL PREDICTION

CROSS-REFERENCE TO RELATED APPLICATIONS AND CLAIM OF PRIORITY

The present application claims priority to U.S. Provisional Patent Application No. 62/960,270 filed on Jan. 13, 2020, and U.S. Provisional Patent Application No. 63/060,934, filed on Aug. 4, 2020. The content of the above-identified patent documents is incorporated herein by reference.

TECHNICAL FIELD

The present disclosure relates generally to wireless communication systems and more specifically to control for mobility channel prediction.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for control for mobility channel prediction. In one embodiment, a BS in a wireless communication system is provided. The BS includes a transceiver configured to receive channel information from a plurality of UEs. The BS further includes a processor operably connected to the transceiver. The processor is configured to determine, based on the channel information, one or more UEs on which to base a channel prediction on by: computing a first set of metrics and a second set of metrics corresponding to the plurality of UEs, wherein computing the first set of metrics has a lower complexity than computing the second set of metrics; performing a selection process on the plurality of UEs based on the first and second set of metrics associated with the plurality of UEs, wherein to perform the selection process, the processor is configured to: select a first subset of UEs from the plurality of UEs based on a first set of metrics, select, from the first subset, a second subset of UEs based on a second set of metrics, and perform the channel prediction based on the second subset of UEs.

In another embodiment, a method for operating a BS in a wireless communication system is provided. The method comprises receiving channel information from a plurality of UEs; determining, based on the channel information, one or more UEs on which to base a channel prediction; computing a first set of metrics and a second set of metrics corresponding to the plurality of UEs, wherein computing the first set of metrics has a lower complexity than computing the second set of metrics; performing a selection process on the plurality of UEs based on the first and second set of metrics associated with the plurality of UEs; selecting a first subset of UEs from the plurality of UEs based on a first set of metrics; selecting, from the first subset, a second subset of UEs based on a second set of metrics; and performing the channel prediction based on the second subset of UEs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the FIG. 1 illustrates an example wireless network according to embodiments of the present disclosure.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The beamforming, massive multiple-input multiple-output (MIMO), Full Dimensional MIMO (FD-MIMO), array antenna, an analog beam forming, large scale antenna techniques are discussed in 5G communication systems.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
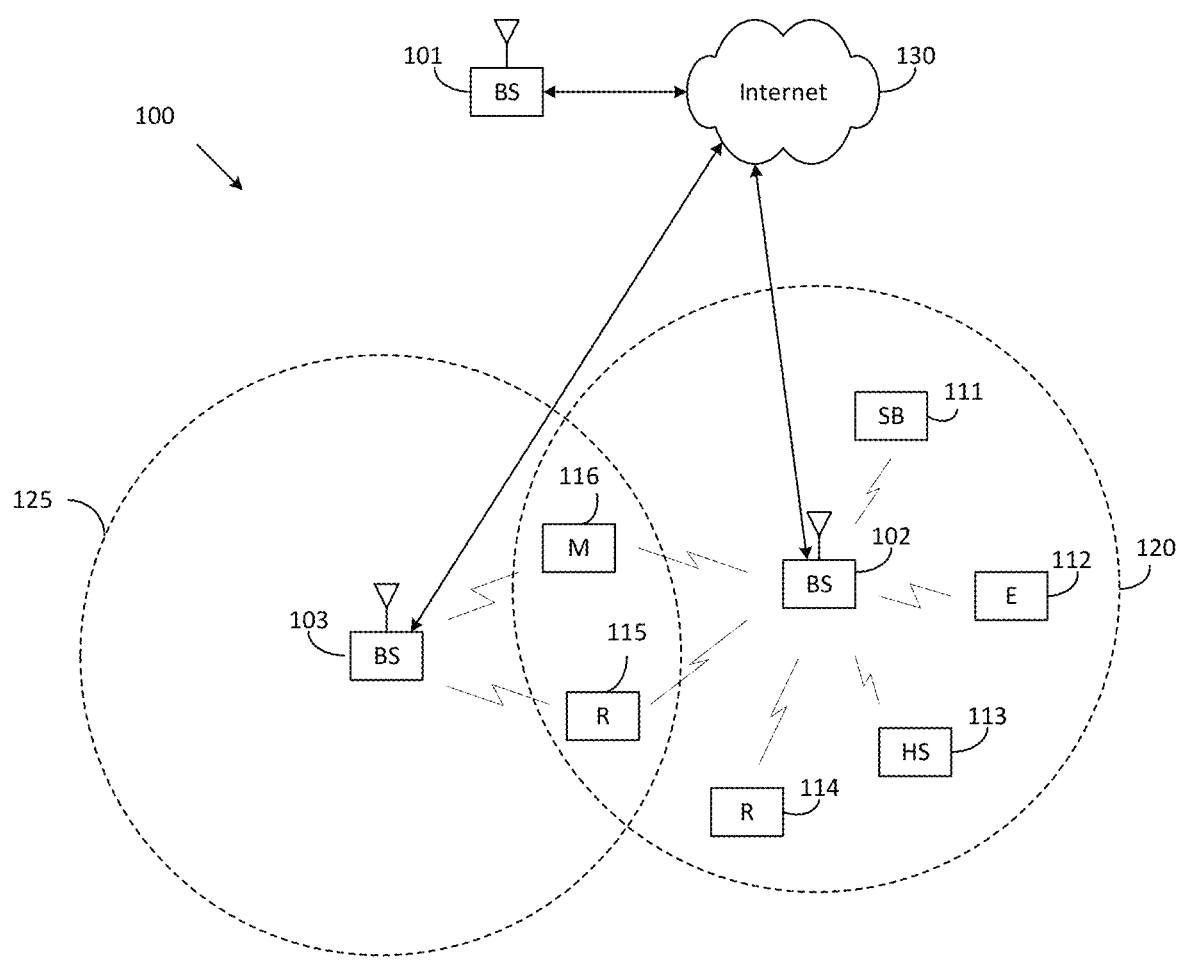
Figure 2:
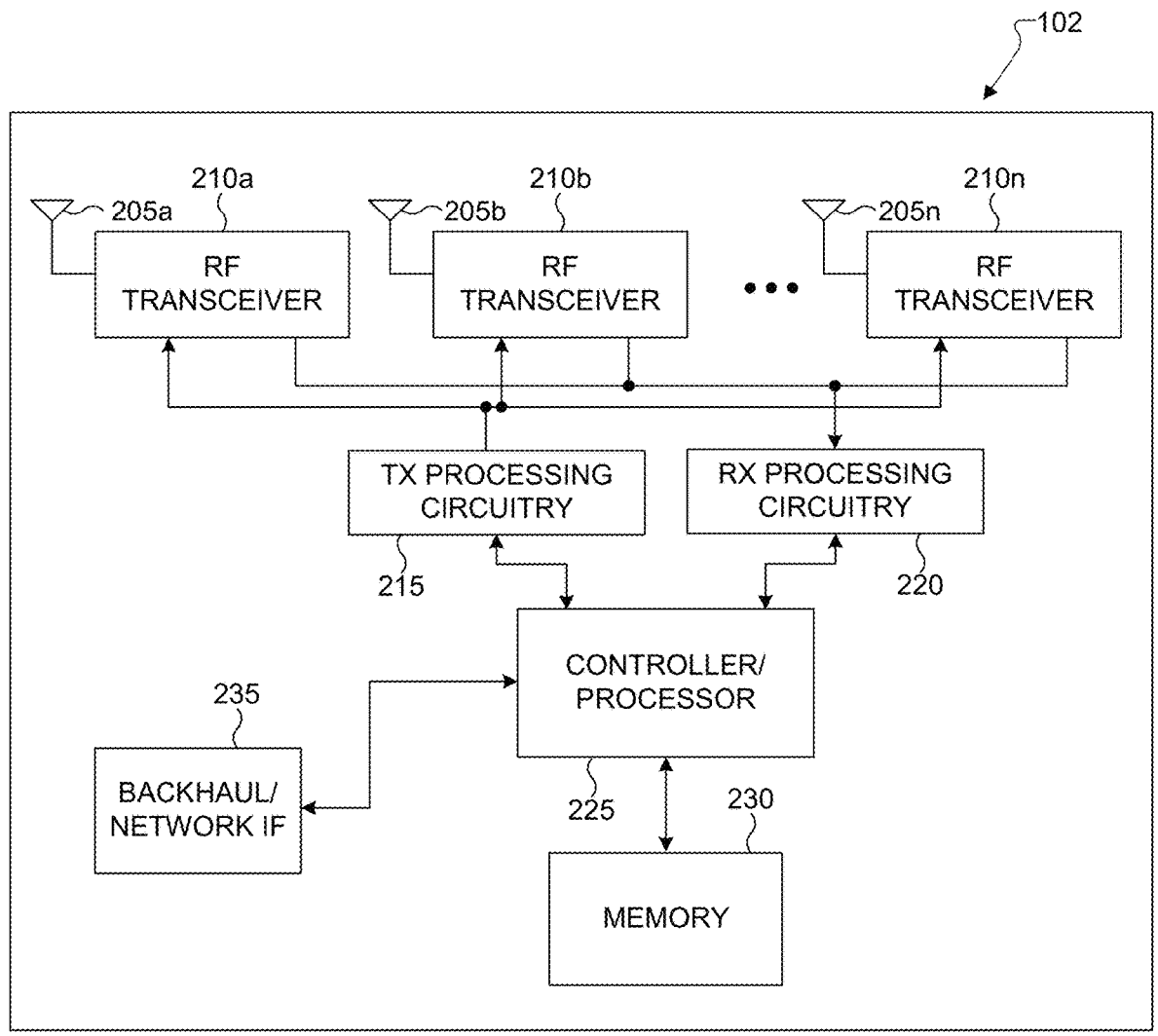
FIG. 2 illustrates an example gNB according to embodiments of the present disclosure.
Figure 3:
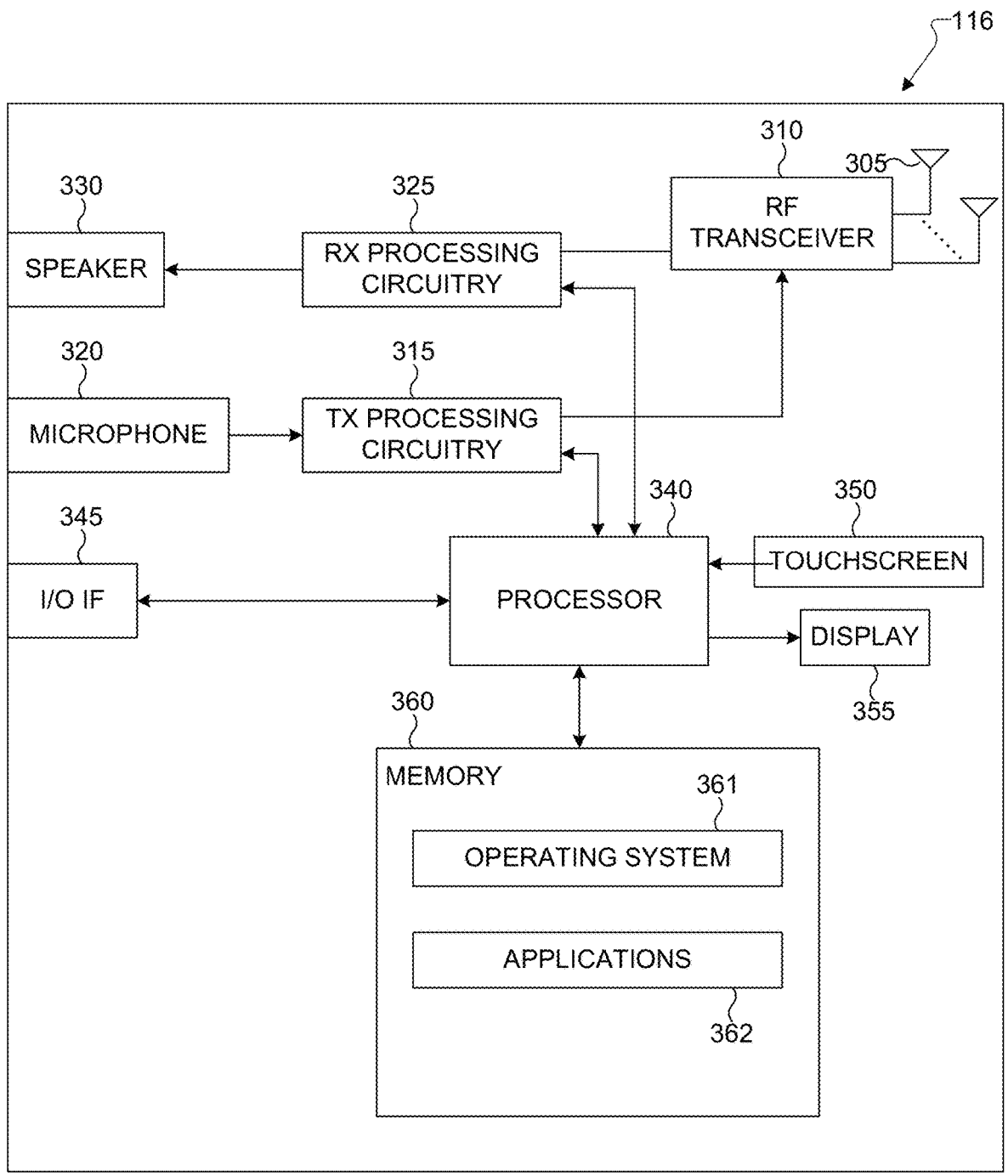
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network includes a gNodeB (gNB) 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the BSs 101-103 includes circuitry, programing, or a combination thereof, for receiving channel information from a plurality of UEs; determining, based on the channel information, one or more UEs on which to base a channel prediction; computing a first set of metrics and a second set of metrics corresponding to the plurality of UEs, wherein computing the first set of metrics has a lower complexity than computing the second set of metrics; performing a selection process on the plurality of UEs based on the first and second set of metrics associated with the plurality of UEs; selecting a first subset of UEs from the plurality of UEs based on a first set of metrics; selecting, from the first subset, a second subset of UEs based on a second set of metrics; and performing the channel prediction based on the second subset of UEs.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as receiving channel information from a plurality of UEs; determining, based on the channel information, one or more UEs on which to base a channel prediction; computing a first set of metrics and a second set of metrics corresponding to the plurality of UEs, wherein computing the first set of metrics has a lower complexity than computing the second set of metrics; performing a selection process on the plurality of UEs based on the first and second set of metrics associated with the plurality of UEs; selecting a first subset of UEs from the plurality of UEs based on a first set of metrics; selecting, from the first subset, a second subset of UEs based on a second set of metrics; and performing the channel prediction based on the second subset of UEs. The controller/processor 225 is also capable of executing an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360 The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
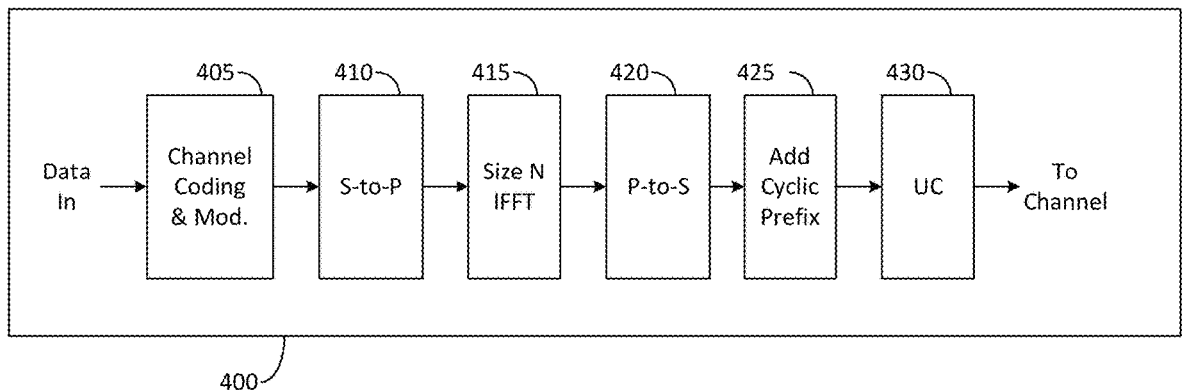
FIG. 4A illustrates a high-level diagram of an orthogonal frequency division multiple access transmit path according to embodiments of the present disclosure.
Figure 4B:
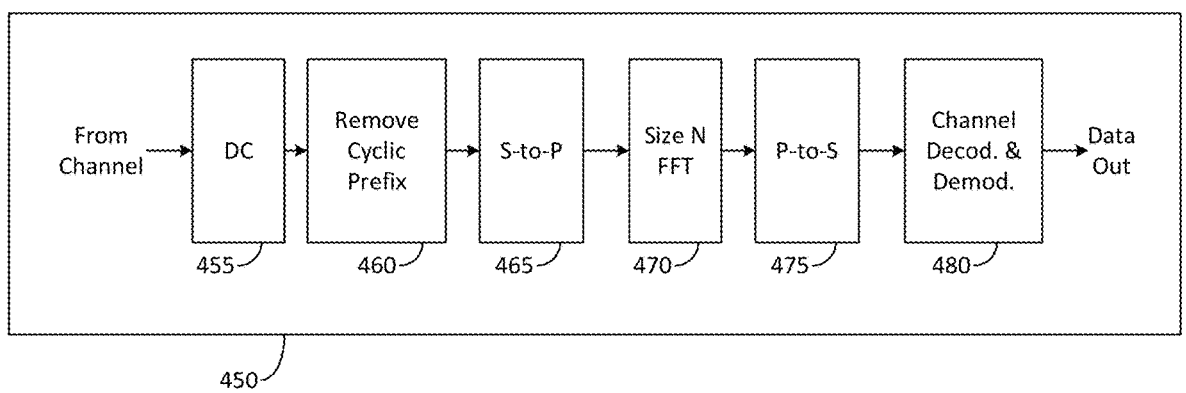
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of transmit path circuitry 450. For example, the transmit path circuitry 450 may be used for an orthogonal frequency division multiple access (OFDMA) communication. In FIGS. 4A and 4B, for downlink communication, the transmit path circuitry 400 may be implemented in a base station (gNB) 102 or a relay station, and the transmit path circuitry 450 may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry 400 may be implemented in a user equipment (e.g., user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in BS 102 and UE 116. The size N IFFT block 415 then performs an IFFT operation on the N parallel symbol streams to produce time-domain output signals. The parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. The down-converter 455 down-converts the received signal to baseband frequency, and remove cyclic prefix block 460 removes the cyclic prefix to produce the serial time-domain baseband signal. The serial-to-parallel block 465 converts the time-domain baseband signal to parallel time-domain signals. The size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of the gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

Although FIGS. 4A and 4B illustrate examples of wireless transmit and receive paths, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

The 3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 5:
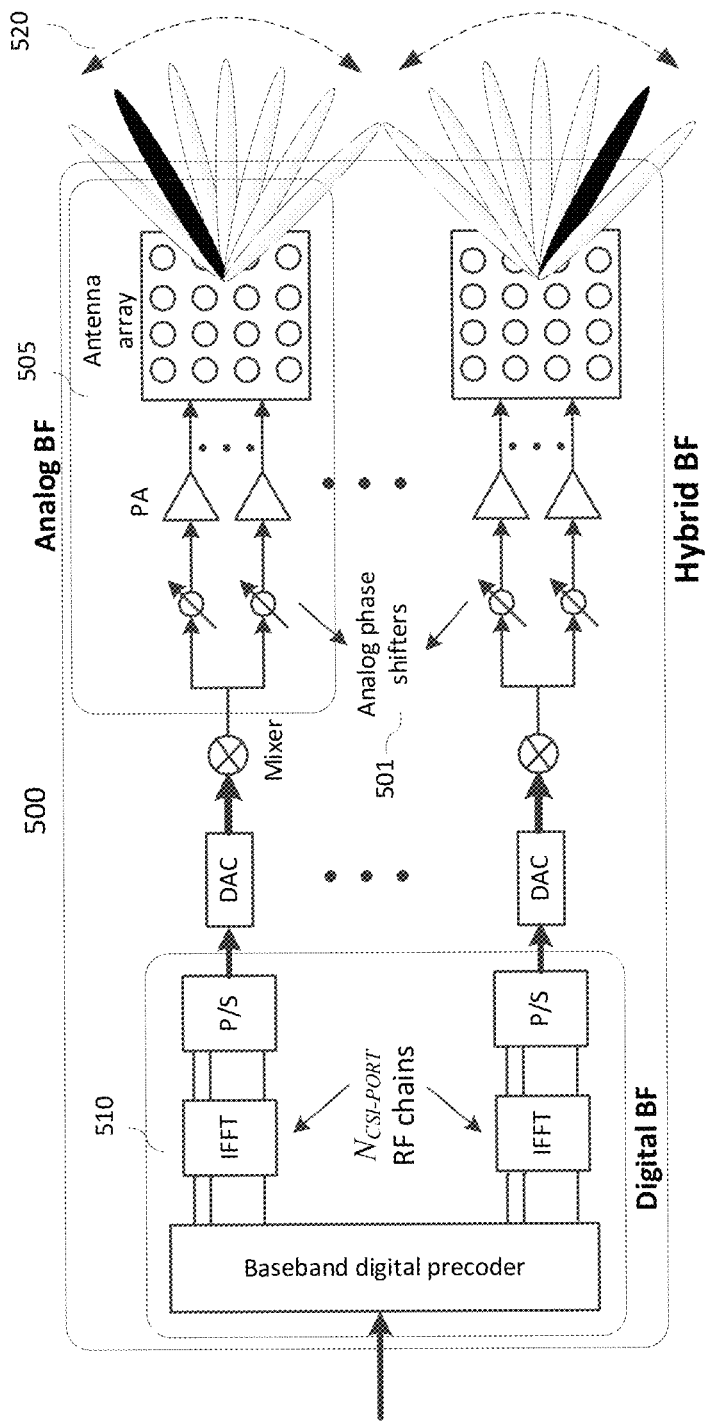
FIG. 5 illustrates an example antenna blocks according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by beamforming architecture 500 in FIG. 5. In this case, one CSI-RS port is mapped onto a large number of antenna elements which can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 510 performs a linear combination across $N_{CSI-PORT}$ analog beams to further increase precoding gain. While analog beams are wideband (hence not frequency-selective), digital precoding can be varied across frequency sub-bands or resource blocks.

A description of example embodiments is provided below. The text and figures are provided solely as examples to aid the reader in understanding the disclosure. They are not intended and are not to be construed as limiting the scope of this disclosure in any manner. Although certain embodiments and examples have been provided, it will be apparent to those skilled in the art based on the disclosures herein that changes in the embodiments and examples shown may be made without departing from the scope of this disclosure.

In TDD systems, the BS exploits UL/DL channel reciprocity to obtain the DL channel and relies on UE transmitted sounding reference signal (SRS) to estimate the channel response. For MIMO systems, obtaining accurate DL channel state information (CSI) is essential to achieve good throughput.

However, the SRS is transmitted periodically with typically 5 ms periodicity each subband (and 20 ms for the entire band). As a result, the BS cannot obtain CSI at each instance. The conventional method to supplement the CSI between the two SRSs' interval is sample-and-hold (SH), i.e., the channel estimate is obtained from previous SRS, and assumed constant until the next SRS is received.

For UEs with mobility, the SH method results in outdated DL channel estimation, hence degraded throughput performance. To overcome this issue, a channel-parameter based channel prediction method has been proposed.

Both path delay tracking and path Doppler tracking rely on the following multipath channel model, where the time-frequency channel response h(t, f) is modeled as a sum of contributions from several multipath components (MPC). The model assumes the channel is constructed on a sum of basis waveforms. We use P sinusoidal waveforms indexed by p=1, 2, . . . , P. Waveform p is parameterized by signal delays $\tau_p$ and signal Doppler shifts $v_p$, which spans both the time and frequency domain. Then, the channel at time t and frequency f is a linear combination of the P basis waveforms:

$$h(t, f) = \sum_{p=1}^{P} \gamma_p e^{-j2\pi(f\tau_p - tv_p)}$$

SRS is sounded on discrete time and frequency points, so the above continuous model is sampled in both time and frequency domains based on SRS pattern. Let us consider $N_{srs}$ consecutive SRS captures, and we denote it as H with dimension $N_{rb} \times N_{srs}$.

$$[H]_{k,n} = h(t_n, f_{n,k})$$

Here n=1, 2, . . . $N_{srs}$, and k=1, 2, . . . , $N_{rb}$. $t_n$ is the time point of the n-th SRS, which is sampled every $P_{SRS}$ TTI. $f_{n,k}$ is the frequency point of the k-th RB associated with the n-th SRS. The association of $f_{n,k}$ with the n-th SRS is necessary to model subband hopping SRS.

The algorithm considers a vectorized signal model for SRS measurement, which we denote as s($\tau$, v, $\gamma$). If the vectorization of H performs first along the frequency domain and secondly along the time domain, we can express s($\tau$, v, $\gamma$) by $$s(\tau,v,\gamma)=vec\{H\}=B(\tau,v)\cdot\gamma=B_{tf}(\tau,v) \diamond B_f(\tau)\cdot\gamma,$$

where parameter vectors $\tau, v \in R^P$, and path weights $\gamma \in C^P$. Also, operator $\diamond$ represents Khatri-Rao product, which is a column-wise Kronecker product. An example of the Khatri-Rao product between two 2×2 matrices is given by $$A \diamond B = \begin{bmatrix} a_{11} & a_{12} \\ a_{21} & a_{22} \end{bmatrix} \diamond \begin{bmatrix} b_{11} & b_{12} \\ b_{21} & b_{22} \end{bmatrix} = \begin{bmatrix} a_{11}b_{11} & a_{12}b_{12} \\ a_{11}b_{21} & a_{12}b_{22} \\ a_{21}b_{11} & a_{22}b_{12} \\ a_{21}b_{21} & a_{22}b_{22} \end{bmatrix}$$

$B_f(\tau)$ is a matrix-valued function, $R^P \rightarrow C^{N_{rb} \times P}$. It represents the difference among sub-bands due to path delay, and its p-th column can be expressed by $$[B_f(\tau)]_p = e^{-j2\pi x_1 \delta_f \tau_p}$$

where $x_1 = [0, 1, \ldots, N_{rb}-1]^T$. $\delta_f$ denotes the frequency spacing of resource blocks (RB). In the case of fullband SRS sounding, $N_{rb}$ is replaced by $N_{rb}^{SRS}$, which is 96 for 20 MHz bandwidth and 48 for 10 MHz bandwidth in LTE. In the case of subband hopping SRS, $N_{rb}$ is 24 for a quarter band of 20 MHz total bandwidth and 12 for a quarter band of 10 MHz total bandwidth.

Similarly, $B_{tf}(\tau,v)$ is also a matrix-valued function. In one embodiment where SRS is updated on a fraction of the total bandwidth every $\Delta t$ seconds, $B_{tf}( )$ represents the inter-band SRS response over time, which depends on both delay $\tau$ and Doppler v in the hopping SRS case, and only Doppler v in the fullband SRS case.

For the hopping SRS, the input and output mapping of $B_{tf}(\tau,v)$ is $(R^P, R^P) \rightarrow C^{N_{srs} \times P}$. Its p-th column can be expressed by $$[B_{tf}(\tau,v)]_p = e^{-j2\pi(m\delta_f \tau_p - n\Delta t v_p)}$$

where n is the time index sequence of SRS in the processing buffer. For example, if the latest SRS is treated as the reference, $n=[-n_{srs}+1, -n_{srs}+2, \ldots, 0]$. m is the corresponding starting frequency index of each hopping subband SRS.

For the full band SRS, the input and output mapping of $B_{tf}(v)$ is $R^P \rightarrow C^{N_{srs} \times P}$. Its p-th column can be expressed by $$[B_{tf}(v)]_p = e^{j2\pi n \Delta t v_p}$$

To extend the vectorized signal model for multiple BS antennas. We assume that path delays and Dopplers are common across $N_{ant}$ antennas. Therefore, we consider the following channel model $$s(\tau,v,\Gamma) = \Gamma \diamond B_{tf}(\tau,v) \diamond B_f(\tau) \cdot 1$$

where $\Gamma$ is a path weight matrix with dimension $N_{ant} \times P$, and each row of $\Gamma$ contains path weights for one antenna. 1 stands for an all-one column vector with dimension P×1. Similarly, $B_{tf}(\tau,v)$ is replaced by $B_{tf}(v)$ for the fullband SRS. The received SRS is corrupted with additive white complex Gaussian noise, which models the uplink thermal noise and interference.

$$y_{srs} = s(\tau, V, \Gamma) + n_0$$

Here $n_0$ is the noise vector and follows a zero-mean complex Gaussian distribution with a covariance matrix $R_n$. In current algorithm development, $R_n$ is configured to be a diagonal matrix $\sigma_n^2 I$. The parameter $\sigma_n^2$ depends on uplink noise and interference power level, which is assumed to be fed by external modules. In further optimization, it can be computed dynamically based on the residual power level at the n-th time instant.

The reconstructed channel matrix for a particular TTI covers the entire bandwidth and the antennas. The reconstructed channel vector is defined by $$\hat{h} \in C^{N_{ant}N_{rb}^{BW} \times 1}$$

for a given TTI, which may be reshaped to the desired dimension for beamforming purposes. The channel is reconstructed by using the following equation:

$$\hat{h}(\Gamma,\tau,v,n_{TTI}) = \Gamma \diamond \tilde{B}(\tau,v,n_{TTI}) \cdot 1,$$

where $\tilde{B}(\tau,v,n_{TTI})$ is a modified basis matrix defined by $$[\tilde{B}(\tau,v,n_{TTI})]_p = e^{-j2\pi(x \cdot \Delta f_{rb} \tau_p - 1 \cdot n_{TTI} \Delta t v_p)},$$

where $[\tilde{B}(\tau,v,n_{TTI})]_p$ denotes the p-th column of $\tilde{B}(\tau,v,n_{TTI})$, x is a RB index vector that ranges the entire (or interested) RB, and $n_{TTI}$ is a targeting TTI index that is relative to the TTI in which the most recent SRS has been received.

For all UEs transmitting sounding reference signals (SRS), a classifier (classifier 1) is applied to choose the UEs suitable for channel prediction operation.

Channel prediction comprises a two operation flow:
Initialization/acquisition:
    For a given set of SRSs, the timing offset and frequency offset of these SRSs are first estimated and compensated (module "Initial TO/FO removal").
    The TO/FO removed SRSs are fed into a time-domain delay search module ("canonical mode search") to down select the delay region with a good amount of power for further search.
    With the down selected delay region, a "grid search module" estimates an initial set of path parameters.
Tracking:
    With the initial parameters provided by initial acquisition, the tracking process will keep updating these parameters.
    For every new SRS signal received, its TO/FO is estimated and removed (module "TO/FO removal").
    The TO/FO removed SRS will be fed into parameter tracking stage, and each path parameter will be updated in sequential order:
        Gamma tracking updates path weights
        Delay EKF updates path delay
        Doppler EKF update path Doppler The channel reconstruction module takes the path parameters provided by either initialization/acquisition or tracking, and generates the frequency response at a desired TTI.

In order to improve the performance of parameterized channel parameter estimation and prediction, an adaptive sample-and-hold prediction residual module is added.

A statistic computation module is designed to compute channel characteristics for classification in next stage.

Finally, a path manager module further decides if the UE needs to be re-initialized; or if the estimated paths need to be merged, dropped, or remain intact when going through the tracking branch; or should exit the prediction core. A classifier (classifier 2) is applied to decide if the UE shall leave the prediction core and spare the computing resource for other UEs with more favorable channel condition for prediction.

Figure 6:
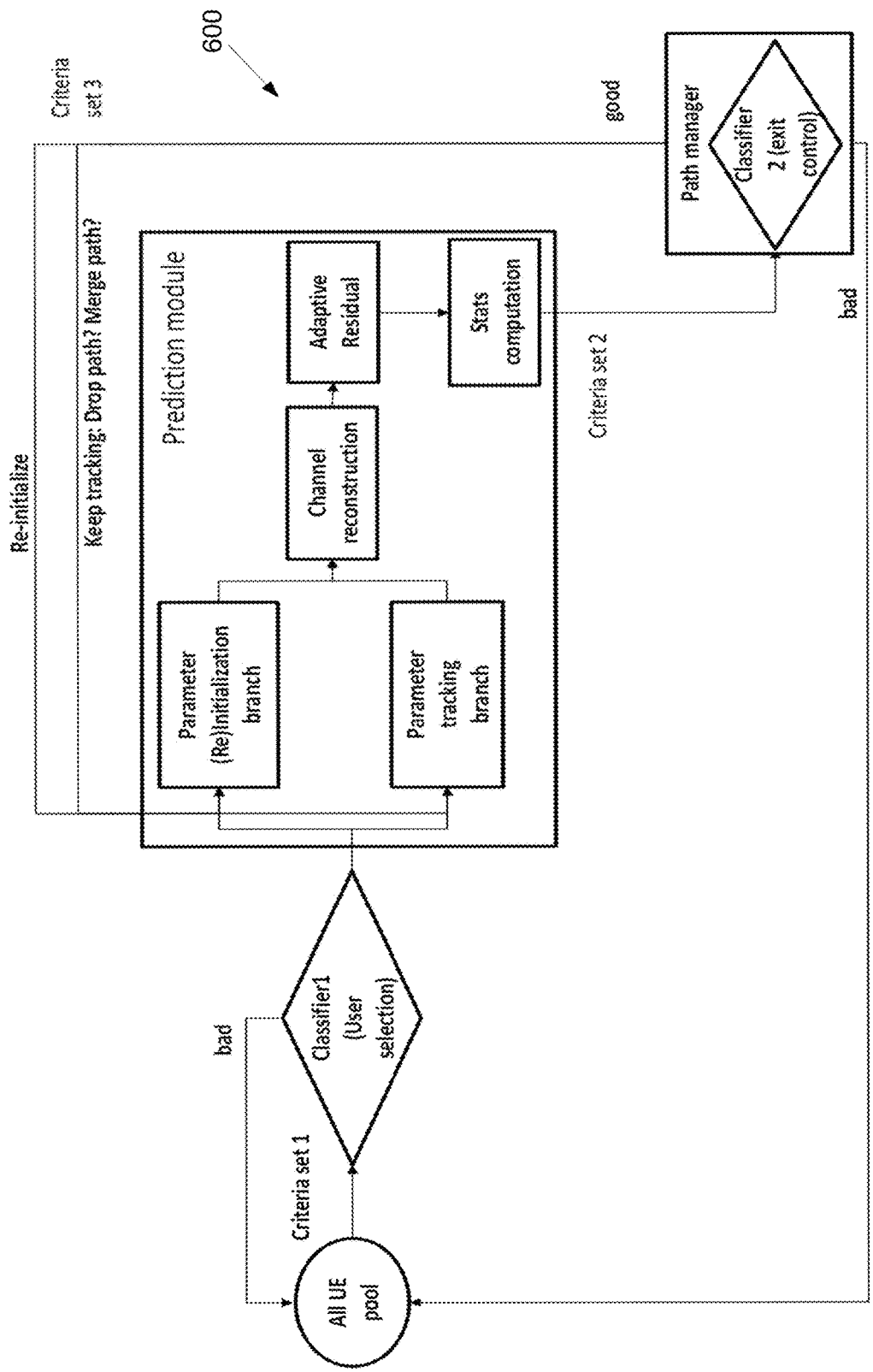
FIG. 6 illustrates an example of the control of the channel prediction operation according to embodiments of the present disclosure.

FIG. 6 illustrates an example of the control of the channel prediction operation 600 according to embodiments of the present disclosure. The embodiment of the channel prediction operation 600 illustrated in FIG. 6 is for illustration only. FIG. 6 does not limit the scope of this disclosure to any particular implementation of the channel prediction operation 600.

This disclosure describes functions of the algorithm control module:
1) User selection (classifier 1)
2) Adaptive residual
3) Path manager, i.e., decide if exit condition (exit control) certain paths should be dropped, switching between initialization/acquisition and the tracking of channel parameters, and if the UE should exit the prediction core to spare resource for more suitable UEs.

The following sections will discuss the modules.

User Selection—due to limited computation resource, channel prediction cannot be configured for all the users. A user selection algorithm is needed to decide a subset of users to be configured with the prediction algorithm. In general, the selection algorithm shall try to select users that can benefit most from the prediction algorithm by considering:

Channel characteristics.
    Some channels are relatively easier to track and once tracked the gain over baseline sample-and-hold is much visible. Some channels are difficult to track and the gain over sample-and-hold is less noticeable.
SRS signal quality.
    The algorithm has a de-noise effect, such that the UEs with noisy (within a certain range) SRS can potentially gain more from the algorithm.
Downlink signal quality and link adaptation.
    The major benefit of channel prediction is to reduce multi-user interference for massive MIMO operation. If downlink SINR is dominated by interference, such benefit can provide large gain. Also the link adaptation status of users shall be accounted, since it will be directly impacted by channel prediction.
UE traffic pattern.
    If the UE's traffic is very short, it may not be beneficial to use prediction algorithm as the algorithm itself may take ~100 ms to be initialized and stabilized.

Figure 7:
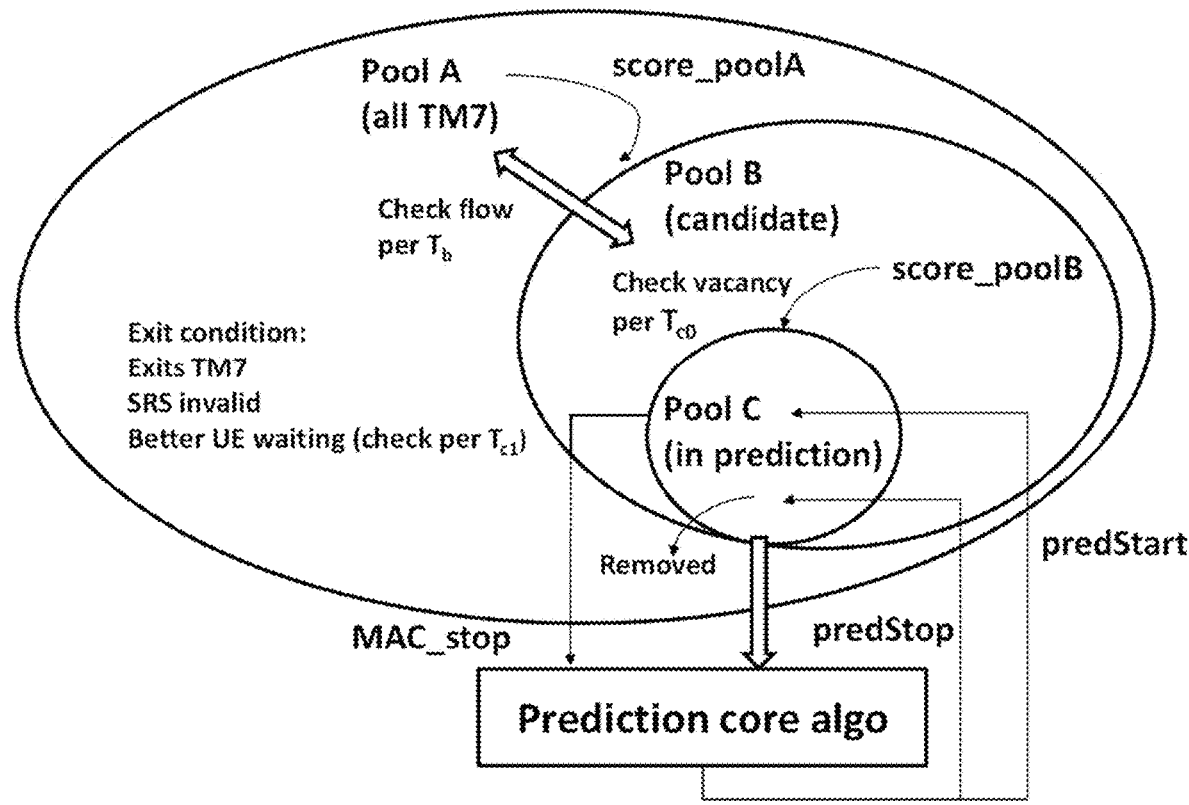
FIG. 7 illustrates an example of the operation of UE selection according to embodiments of the present disclosure.

FIG. 7 illustrates an example of the operation of UE selection 700 according to embodiments of the present disclosure. The embodiment of the operation of UE selection 700 illustrated in FIG. 7 is for illustration only. FIG. 7 does not limit the scope of this disclosure to any particular implementation of the operation of UE selection 700.

As illustrated in FIG. 7, Pool A contains all UEs transmitting SRS. A pre-selection is performed using metrics involving almost-none computation complexity to down select UEs in Pool B. For the UEs in Pool B, more complexity-involved metrics are computed to further down-select UEs in Pool C, in which the UEs will be applied the prediction algorithm. The score_poolA is computed based on each UE's SRS SNR and buffer occupancy (BO), which are both available from the modem report. The score_poolB is computed based on each UE's SRS SNR, BO, the channel's dominant eigen value ratio (to be computed, requires high complexity), and estimated sample-and-hold cross-correlation from SRS buffer (to be computed, requires medium complexity).

The UE selection operation is to down-select Nc UEs for channel prediction operation from all TM7 UEs. The input and output of UE selection module is summarized in Tables 1 and 2 below.

TABLE 1

Input parameter table for user selection

| Name | Description | Source |
| --- | --- | --- |
| MCS | To monitor change in MCS | MCS determination |
| TM7 UE pool | Monitor if UE enters/exits TM7 | Mode adaptation |
| SRS | Un-normalized SRS from modem | Modem → SRS buffer |
| sbPattern | Hopping pattern | hopping pattern buffer |

TABLE 1-continued

Input parameter table for user selection

| Name | Description | Source |
| --- | --- | --- |
| SRS SINR | Instantaneous SRS SINR, in dB scale | Channel_status_manager |
| Non-GBR BO | UE traffic | |
| dual-sim, flag_inactive_SRS, low_SRS_power, M-gap/DRX-gap collision, Abnormal_flag | SRS condition flags | |
| predStop | Prediction core has safely terminated a UE | Mobility prediction |
| predStart | Prediction core has started for a UE | Mobility prediction |
| selBypass | UE selection module is bypassed | System config |

TABLE 2

Output parameter table for user selection

| Name | Description | Destination |
| --- | --- | --- |
| Prediction UE pool | UEs to enter prediction algorithm | Mobility Prediction |
| MAC_stop | UE selection decides a UE shall exit prediction core | Mobility Prediction |

SRS Buffer Structure for User Selection of Mobility Prediction

In this paragraph, the intermediate computed and configurable parameters are summarized in table 3 below:

TABLE 3

Intermediate computed and configurable parameters

| Name | Value | Description |
| --- | --- | --- |
| buffer_ready_i | Computed, True/False | SRS buffer has accumulated required length |
| $N_{SRS}$ | Configurable, default 8, can be 16 | Length of SRS buffer |

A buffer is allocated to store SRS for users in TM7. Each user stores $N_{SRS}$ subband (SB) SRS snapshots, where $N_{SRS}$ is a configurable parameter, with default value 8. Let $h_{i,t}$ denote the ith UE's un-normalized channel matrix on a subband, reported from modem at time instance t. $h_{i,t}$ is a vector of length $N_{BS} \cdot N_{RB_{SB}}$, where $N_{BS}=32$ is the number of transmit antennas, and $N_{RB_{SB}}$ is the number of RBs per subband (24 when bandwidth is 20 MHz, and 12 when bandwidth is 10 MHz).

At time t, user i th's buffer contains $[h_{i,t-(N_{SRS}-1)}, h_{i,t-(N_{SRS}-2)}, \ldots h_{i,t}]$, and at SRS period instance t+1, the buffer will be updated to $[h_{i,t-(N_{SRS}-2)}, h_{i,t-(N_{SRS}-3)}, \ldots h_{i,t+1}]$, i.e. first-in-first-out. The corresponding subband index for $h_{i,t}$ is recorded in a pattern buffer, e.g., one of $\{0,2,1,3\}$.

After RRC configuration or reconfiguration for a user, for example due to mode adaptation, eNB will need some time to get all $N_{SRS}$ SRS channel ready. A flag buffer_ready_i indicates the status of the buffer for UE i.

When a UE first enters TM 7 mode, its buffer_ready_i flag is false.

When the UE ith's buffer has been updated with at least $N_{SRS}$ consecutive valid SRS snapshots, the flag buffer_ready_i shall be set to true, otherwise the flag shall be false.

buffer_ready_i is set to false after every RRC (re)configuration.

buffer_ready_i is set to false when the SRS transmission is reconfigured.

When SRS is invalid (e.g. dual-sim, low_SRS_power, collision with M_gap/DRX_gap, SRS inactive), the corresponding UE's buffer_ready_i is set to false.

The user selection algorithm and subsequent modules only operates for the UE when its buffer_ready flag is true.

Criteria for User Selection for Mobility Prediction

The user selection module scores each UE its suitability for channel prediction.

Three user pools (pool A, pool B and pool C) are maintained.

pool A: All TM7 users with SRS configured.

pool B: Down selected users from pool A using existing metrics and extremely low computation.

pool C: Down selected users from pool B using simple computation to perform channel prediction.

For users in a pool, associated scores are computed and used for selection to the next pool. First, score_poolA is computed using simple metrics such as SINK and BO to down-select users with buffer_ready_i=true, which is denoted as pool A. The selected users from pool A are collected as pool B. Second, score_poolB is computed to further down-select users in pool B. The selected users from pool B are collected as pool C. UEs in pool C will be applied to channel prediction algorithm.

The score calculation is described in this subsection and the detailed selection based on scores will be described in the sequel subsections.

Score_poolA Calculation

The design philosophy is to award UEs with large non-GRB BO, as it gets high chance to be scheduled as MU-MIMO UE. When the SRS SINR is extremely low, the prediction cannot be reliable and thus such users are discarded for mobility prediction. When the SRS SINR is above a certain threshold, award the UEs with lower SINR, as there is processing gain in addition to prediction gain. The score_poolA shall be reset to 0 when there the UE's SRS status is abnormal. In this paragraph, the intermediate computed and configurable parameters are summarized in Table 4 below

TABLE 4

| Name | Value | Description |
|---|---|---|
| score_poolA$_{i,t}$ | Computed, within [0, 10] | poolA score for UE i at instance t |
| S$_{BO,i,t}$ | Computed, within [0, 10] | BO score for UE i at instance t |
| S$_{SINR,i,t}$ | Computed, within [0, 10] | SRS SINR score for UE i at instance t |
| score_poolA_valid_i | Computed, True/False | When core_poolA$_{i,t}$ can be used |
| c$_{BO}$ | Configurable, default 0.5 | Score weight of S$_{BO,i,t}$ |
| c$_{SINR}$ | Configurable, default 0.5 | Score weight of S$_{SINR,i,t}$ |
| a$_{BO1}$ | Configurable, default $\frac{10}{BO_{thre,0}}$ | Coefficient of S$_{BO,i,t}$ computation |
| a$_{BO2}$ | Configurable, default $\frac{5}{BO_{thre,0}}$ | Coefficient of S$_{BO,i,t}$ computation |
| BO$_{thre,0}$ | Configurable, default 100Th_BO_nGBR | Threshold of S$_{BO,i,t}$ |
| BO$_{thre,1}$ | Configurable, default Th_BO_nGBR, MU pairing BO threshold | Threshold of S$_{BO,i,t}$ |
| α$_{SINR}$ | Configurable, default 0.2 | Smoothing factor for filtering S$_{SINR,i,t}$ |
| α$_{BO}$ | Configurable, default 0.2 | Smoothing factor for filtering S$_{BO,i,t}$ |
| x$_a$ | Configurable, default 8 | score_poolAi update times before score_poolA_valid_i can be set to true |

For i-th UE in pool A, the score_poolA$_i$ at the t-th SRS period is computed as $$\text{score\_poolA}_{i,t} = \begin{cases} 0, & \text{if } S_{BO,i,t} == 0 \text{ or } S_{SINR,i,t} == 0 \\ c_{BO}S_{BO,i,t} + c_{SINR}S_{SINR,i,t}, & \text{otherwise} \end{cases}$$

The score range of $S_{BO,i,t}$ is [0, 10]. The score range of $S_{SINR,i,t}$ is [0,10]. $c_{BO}$ and $c_{SINR}$ are configurable combining coefficients, with default value 0.5.

The calculation of score $S_{SINR,i,t}$ is as below $$S_{SINR,i,t} = \begin{cases} 10, & \text{if } 5 \leq SINR_{i,avg,t} < 10 \\ 7, & \text{if } 10 \leq SINR_{i,avg,t} < 20 \\ 4, & \text{if } 20 \leq SINR_{i,avg,t} \\ 1, & \text{if } 0 \leq SINR_{i,avg,t} < 5 \\ 0, & \text{if } SINR_{i,avg,t} < 0 \end{cases}$$

$$SINR_{i,avg,t} = \alpha_{SINR}SINR_{i,t} + (1-\alpha_{SINR})SINR_{i,avg,t}$$

where $\alpha_{SINR}$ is the smoothing factor (default 0.2, configurable), and $SINR_{i,t}$ is an instantons SRS SINR provided by MAC in dB scale. Note: The above SINR score table shall be configurable.

SBO,i,t is a score associated with average non-GBR BO for UE i at time instance t, calculated as following:

$$S_{BO,i,t} = \begin{cases} 10, & \text{if non} - GBR\,BO \geq BO_{thre,0} \\ a_{BO1}*\text{non} - GBR\,BO_{i,t}, & \text{if } BO_{thre,1} \leq \text{non} - GBR\,BO < BO_{thre,0} \\ 0, & \text{if non} - GBR\,BO < BO_{thre,1} \end{cases}$$

where $a_{BO1}$, $a_{BO2}$ and $BO_{thre}$ are configurable parameters, with default $BO_{thre,1}$=Th_BO_nGBR, $BO_{thre,0}$= 100Th_BO_nGBR, and Th_BO_nGBR the threshold for entering MU pairing; and $$a_{BO1} = \frac{10}{BO_{thre,0}}.$$

The design philosophy is to award UEs with more BO, such that they are likely to remain in MU mode for a longer period of time. The filtered average non-GBR BOi,t is computed as non-GBR BOi,t=$\alpha_{BO}$ non-GBR BOi,(t−1)+(1−$\alpha_{BO}$) non-GBR BOi,t,instantaneous, where $\alpha_{BO}$ is configurable parameters with default 0.2.

The ith UE's score_poolAi only is updated periodically, with periodicity equal to the SRS periodicity, when its SRS buffer is updated.

When the ith UE's score_poolAi has been updated at least xa times, the score is considered valid, and the flag score_poolA_valid_i should be set to true. xa is a configurable parameter, with default value 8.

When any of the follow events happens, the score_poolA$_i$ is set to 0, score_poolA_valid_i is reset to false, reset the counter for calculating score_poolA$_i$ to 0, and buffer_ready_i is set false.

1) UE enters dual-sim mode
2) The UE's flag_inactive_SRS is true, or low_SRS_power flag is true, or M-gap/DRX-gap collision is true
3) Abnormal_flag is true Score_poolB Calculation In this paragraph, the intermediate computed and configurable parameters are summarized in Table 5 below

TABLE 5

| Name | Value | Description |
| --- | --- | --- |
| score_poolBi | Computed, within [0, 10] | poolB score for UE i at instance t |
| $S_{eig, i}$ | Computed, within [0, 10] | eigen ratio score for UE i |
| $S_{SHX, i}$ | Computed, within [0, 10] | shXcorr score for UE i |
| $c_{eig}$ | Configurable, default 0.3 | Weight of score $S_{eig, i}$ in score_poolBi |
| $c_{SHX}$ | Configurable, default 0.3 | Weight of score $c_{eig}$ in score_poolBi |
| $c_{scorea}$ | Configurable, default 0.4 | Weight of score_poolAi in score_poolBi |
| $a_{eig, 1}$ | Configurable, default 10/ $(1 - a_{eig2})$, | Parameter for computing $S_{eig, i}$ |
| $a_{eig, 2}$ | Configurable, default 0.6 | Parameter for computing $S_{eig, i}$ |
| $eig_{thre}$ | Configurable, default 0.7 | Parameter for computing $S_{eig, i}$ |
| $Xcorr_{thre0} \ldots Xcorr_{thr}$ | Configurable, default [0.3, 0.6, 0.75, 0.95] | Parameter for computing $S_{SHX, i}$ |
| $N'_{BS}$ | Configurable, default 16 | Down-sampled antenna number |
| $N'_{RB_{SB}}$ | Configurable, default 4 | Down-sampled RB number |

For the ith UEs in pool B, score_poolBi is calculated in addition. Two metrics are computed: eigen_ratio (spatial covariance matrix and dominant eigen-power ratio) and SH_Xcorr (Sample-hold and prediction correlation).

The scores related to eigen_ratio and SH_Xcorr, $S_{eig}$ and $S_{SHX}$ are computed as follows:

$$S_{eig,i} = \begin{cases} a_{eig,1} * (eigen_{ratio,i} - a_{eig2}), & \text{if } eigen_{ratio,i} \geq eig_{thre} \\ 0, & \text{otherwise} \end{cases}$$

where $a_{eig1}$, $a_{eig2}$, $eig_{thre}$ are configurable parameters with default value $a_{eig1}=10/(1-a_{eig2})$, $a_{eig2}=0.6$, $eig_{thre}=0.7$.

The intuition is that if few eigenvalues capture the majority of the channel energy, the channel condition is suitable for prediction.

$$S_{SHX,i} = \begin{cases} 0, & \text{if } SH\ Xcorr > Xcorr_{thre3}\ SH\ Xcorr < Xcorr_{thre0} \\ 5, & \text{if } SH\ Xcorr \in [Xcorr_{thre0}, Xcorr_{thre1}) \\ 10, & \text{if } SH\ Xcorr \in [Xcorr_{thre1}, Xcorr_{thre2}) \\ 7, & \text{if } SH\ Xcorr \in [Xcorr_{thre2}, Xcorr_{thre3}) \end{cases}$$

with configurable thresholds, default $Xcorr_{thre0}=0.3$, $Xcorr_{thre1}=0.6$, $Xcorr_{thre2}=0.75$, $Xcorr_{thre3}=0.95$. The score table above should be configurable, as illustrated in FIG. 8.

Figure 8:
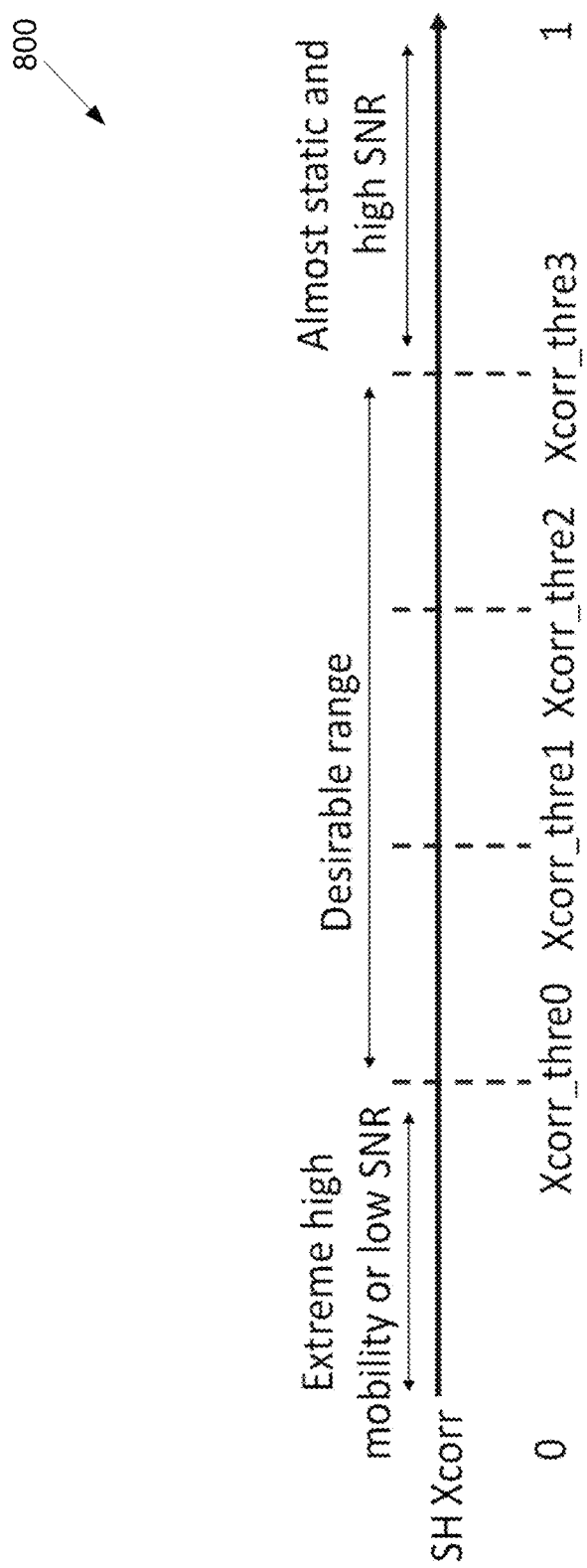
FIG. 8 illustrates an example of different prediction correlation thresholds according to embodiments of the present disclosure.

FIG. 8 illustrates an example of different $X_{corr}$ thresholds 800 according to embodiments of the present disclosure. The embodiment of the different $X_{corr}$ thresholds 800 illustrated in FIG. 8 is for illustration only. FIG. 8 does not limit the scope of this disclosure to any particular implementation of the different $X_{corr}$ thresholds 800.

If the SH Xcorr is extremely low, it may indicate the channel varies too fast OR SRS SNR is extremely low for prediction. If SH Xcorr is very high, it may indicate the channel is very static and SRS SNR is high, and thus prediction gain is limited.

When the UE SRS buffer updates for ith UE, instantaneous eigen_ratio and SH_Xcorr are updated. The calculation steps are described as below:

1) Down-Sample the SRS Buffer

The eigen_ratio and SH_Xcorr are computed using the channels in SRS buffer, $h_{i,t}$ and $h_{i,t-4}$.

In order to reduce computation complexity, only a sub-set of SRS buffer is used. For example, the channel is uniformly down sampled to length $N'_{BS} \cdot N'_{RB_{SB}}$, where $N'_{BS}$ and $N'_{RB_{SB}}$ are configurable parameters, with default value $N'_{BS}=16$ and $N'_{RB_{SB}}=4$. When $N_{BS}=64$ and $N_{RB_{SB}}=12$ (for 10 MHz), the SRS is down-sampled every 4 antennas, and every 3RBs. Denote the down-sampled channel as $h'_{i,t}$ and $h'_{i,t-4}$.

2) Compute the Eigen_Ratio.

In order to track spatial property of the channel, a spatial covariance matrix is calculated. Denote $h(f,n)=[h_1(f,n) \ldots h_K(f,n)]^T$.

$$R_{sp}(n) = \sum_f h(f, n) \cdot h^H(f, n)$$

Use eigenvalue decomposition to obtain the eigenvalues of $R_{sp}(n)$, $$\lambda_1 \geq \lambda_2 \geq \ldots \geq \lambda_K$$

Calculate the dominant eigen power ratio as:

$$r_{eig} = \frac{\sum_{i=1}^{N_\lambda} \lambda_i}{\sum_{i=1}^{K} \lambda_i}$$

Default value of $N_\lambda=2$.

To meet complexity requirement, h can also refer to down-sampled SRS buffer.

To avoid ping-pong effect of the eigen value ratio, the IIR filtered value is used $$r_{eig,avg,t} = \alpha r_{eig,t} + (1-\alpha) r_{eig,avg,t-1}$$

3) Compute the SH_Xcorr

If we use $y_{k,m,n}$ to denote SRS estimates stored in the channel buffer, the instantaneous sample-hold correlation is calculated by $$SH\ Xcorr = E\left\{\frac{|a_m b_m^H|}{|a_m|_2 |b_m|_2}\right\}$$

Here $a_m$, $b_m$ are row vectors with length $N_{ant}$, and they are samples from either SRS estimates or reconstructed channel based on EKF parameters.

$$a_m = y_{:,m,N_{srs}-4}$$

$$b_m = y_{:,m,N_{srs}}$$

where the notation $y_{:,m,N_{srs}-4}$ refers to SRS estimates on all antennas sampled at m-th RB and $(N_{srs}-4)$-th time-domain SRS capture, such that $y_{:,m,N_{srs}}$ and $y_{:,m,N_{srs}-1}$ are on the same SRS hopping subband. The expectation operator is performed over different frequency domain samples. The operator $|x|_2$ computes the 2-norm of the vector x. $a_m$, $b_m$ can refer to down-sampled SRS buffer.

The SH_Xcorr is computed every time the UE i's SRS buffer updates, and eigen_ratio is computed once every Ksh SRS buffer updates. Note Ksh=5 is chosen so that all subbands can be used in this calculation (5 cannot be divided by 4), and it can be configured to other values.

To avoid ping-pong effect of the eigen value ratio, the IIR filtered value is used $$SH\ Xcorr_{avg,t} = \alpha SH\ Xcorr_t + (1-\alpha) SH\ Xcorr_{avg,t-1}$$

For ith UE, its score_poolB$_i$ is computed as $$score\_poolB_i = c_{eig}S_{eig} + c_{SHX}S_{SHX} + c_{scorea}\ score\_poolA_i$$

where $c_{eig}$, $c_{SHX}$, $c_{scorea}$ are configurable combining coefficients, with default value 0.3, 0.3 and 0.4, respectively.

For instance, when a UE has average SINR=16 dB, BO=0.8, eigen ratio=0.85, and SH Xcorr=0.7, it will have score_poolA=7.5, and score_poolB=7.95

When a UE's score_poolB$_i$ has been updated at least $x_b$ times, the score is considered valid, and the flag score_poolB_valid_i should be set to true. $x_b$ is a configurable parameter, with default value 8.

UE Pools (Pool B and Pool C) Selection

In this subsection, the intermediate computed and configurable parameters are summarized in Table 6 below.

Overall operation: (1) down selects UEs with best score_poolA from pool A into pool B, and then (2) calculate score_poolB in pool B, and select the best UEs for prediction into pool C.

Note to DSP: debug flag needs in place to force a particular UE move from pool A to pool C as well as moving from pool C to pool A regardless of scores.

The pool maintenance is described by 2 operations:
1) Scoring pool A, which describes from when a UE first enters pool A until it can enter pool B and pool C
2) Pool update, containing three operations
   a. Update pool B
   b. Update pool C
   c. Exit control Scoring pool A Assuming TM7 UE pool is A=[1, 2, ... $N_{TM7}$]. This pool is updated whenever there is a UE entering/exiting TM7. The initialization starts when there is at least 1 UE in pool A have buffer_ready status to be true.

Compute score_poolA for all UEs in pool A every SRS periodicity, when the UE's SRS buffer is updated. When a UE's score_poolA_valid becomes true, its score_poolA can be used for ordering the UEs.

In the initial stage, pool B, and pool C, are both empty.

After the initial ordering is done, the module selects the UEs with highest score_poolA from A and fill into prediction candidate pool B, until B contains Nb UEs, or A\B contains no more UEs with valid and positive score_poolA score.

If multiple UEs have same score_poolA, randomly select required number of UEs into pool B.

When pool B is non-empty, calculate score_poolB for UEs in B. When a UE's score_poolB_valid flag is true, the

TABLE 6

| Name | Value | Description |
| --- | --- | --- |
| Nb | Configurable, default 32 | Target UE number in pool B |
| Nc | Configurable, default 8 | Target UE number in pool C |
| $T_b$ | Configurable, default 100 SRS period | Pool B UE ordering interval |
| $T_{pro,b}$ | Configurable, default 200 SRS period | Pool B protection period; a UE must stay in pool B for this period before it can be moved out to pool A due to low score |
| score_b_thre | Configurable, default 2 | Remove a UE from pool B if it's score_poolB is lower than this value |
| delta_a | Configurable, default 200 SRS period | Pool B protection threshold; to swap UEs in Pool A and Pool B, the score_poolA difference must be greater than this threshold |
| $T_{c0}$ | Configurable, default 50 ms | UE admission interval into pool C |
| $T_p$ | Configurable, default 50 ms | UE admission interval into prediction initialization |
| $T_{c1}$ | Configurable, default 200 SRS period | Pool C exit check interval |
| $T_{c2}$ | Configurable, default 200 SRS period | Pool C exit protection interval; if a UE has started prediction core, it must stay in prediction core for this period before being removed from Pool C |
| delta_c | configurable, default 3 | Pool C exit protection threshold; if a UE in pool C has lower score_poolB than the best UE in B\C by this threshold, it shall be removed |

This subsection describes how the user pool are selected based on the score aforementioned. A TM7 UE pool A is informed by mode adaptation module. The pool B targets to maintain Nb UEs, and pool C targets to maintain Nc UEs. The $N_b$ and $N_c$ are configurable parameters, with default value $N_b$=32, and $N_c$=8.

UE is available for ordering. Assuming the channel prediction algorithm can support up to $N_b$ users, the module selects the UEs with highest score_poolB from pool B for prediction (pool C). Each time, the module selects 1 UE to put into pool C. After pool C takes a new UE, the module waits for at least $T_{c0}$ time interval (configurable, default 50 ms) before selecting a next UE into pool C.

If multiple UEs have same score_sel_b, randomly admit one of UEs into pool C.

Pool Update

After the UE pools are initialized, the pools shall be monitored to accommodate dynamical change. The design philosophy is that the candidate pool shall be monitored to guarantee that UEs in pool B have the best pre-selection scores; meanwhile frequent change of UEs in pool C (already in prediction) shall be prevented to alleviate algorithm initialization overhead. The exit control of UEs in pool C can be initiated by the prediction algorithm, or the user selection module.

We denote UEs in pool A but not in pool B (in TM7, but not a prediction candidate), as A\B; and denote UEs in pool B but in pool C (is a prediction candidate, but not already in prediction core), as B\C, a. Update Pool B The score_poolA of UEs in A is updated every SB SRS period (5 ms or 10 ms). But the ordering of pool B happens less frequent, i.e., every $T_b$ (configurable, default 100 SRS period) SRS periods, the UE selection module re-orders the UE candidate of the pool B, during the update:

Move UEs from pool B to pool A: If any of below condition is satisfied, remove the UEs from B\C, and set its score_poolA_valid to be false
  If a UE in B\C has score_poolB lower than score_b_thre (configurable, default 2), and the UE stayed in pool B for at least $T_{pro,b}$ (configurable, default 200 SRS period).
  If a UE in B\C has score_poolA_valid or buffer_ready has been reset
This step is to ensure the candidate UEs who are waiting to enter the prediction core are always the most suitable for channel prediction. The UEs removed from pool B will not have score_poolB.

Move UEs from pool A to pool B: If the number of UEs in B is smaller than the target UE number $N_b$, supplement the pool B with the UEs in A\B of highest scores, until there are $N_b$ UEs in pool B, or there are no more UEs in A\B with positive scores.

Swap UEs between pool A and pool B: If pool B is full, there are UEs in A\B having score_poolA which is delta a (configurable, default 2) higher than score_poolA of the UEs in B\C, swap these UEs. The swap shall follow the below order pair: ($1^{st}$ largest score_poolA in A\B, $1^{st}$ smallest score_poolA in B\C), ($2^{nd}$ largest score_poolA in A\B, $2^{nd}$ smallest score_poolA in B\C) and so on. A UE shall stay in pool B for at least $T_{pro,b}$ (configurable, default 200 SRS period) before it can be swapped out. If a UE in Pool B is listed as one of the smallest scored UEs, and does not satisfy the protection period, the UE shall be skipped.

b. Update Pool C

The score_poolB of pool B is updated every SB SRS period (5 ms or 10 ms) when SRS is updated.

The maintenance of pool C is based on score_poolB, and consists two independent operations, checking
  If the pool C has vacancy; and
  If any UE in pool C needs to be removed.

Every $T_{c0}$ interval (default 50 ms), the selection module checks pool C vacancy: If the number of UEs in pool C is smaller than the target UE number $N_c$, supplement the pool C with one UE in B\C (the waiting list) of highest scores. This step is to ensure the prediction core takes maximum numbers UEs possible. The timeline to supplement pool C shall align with the initialization scheduling timeline of the prediction core.

The 'predStop' is a per UE flag sent by the prediction algorithm core, indicating the prediction engine has stopped for this UE. When predStop is received, this UE shall be removed from pool C to pool A\B, (such that the UE will also be removed from pool B). Multiple UEs can be removed at the same time.

The 'predStop' condition is described in next paragraphs, the mobility prediction function.

The update operations of pool C can be summarized in below pseudo code

```
If mod(tti, T_c0)==1
    Update score
        If length(Pool C) < N_c
            Supplement 1 UE into Pool C with the best score UE in
              B\C
        End
End
If (any UE sends Stop)
    Remove the UE from pool C to pool A.
End
```

In another instance, a trained classifier can be applied to further limit the number of UEs in pool B to be ranked. The classification criteria consists SRS SNR, eigen value ratio, and estimated SH cross-correlation. Such that the selection of Pool C UE is only performed on the most likely UEs.

In another instance, a trained classifier can also perform regression and directly chose the Nc most suitable UEs for channel prediction.

Table 7 below is a table showing simulation results of a potential classifier. A UE is labeled as 'large gain UE' if the channel prediction algorithm yields 4 dB DL SIR gain to the UE. The table shows the true positive rate of chosen a large gain UE.

TABLE 7

| SRS SNR | True Positive rate | Training size | Test size |
|---|---|---|---|
| 0 dB | 99% | 9028 | 2257 |
| 10 dB | 93% | 8685 | 2172 | c. Exit Condition Triggering

The exit condition here describes the decision that the UE selection module indicates a UE shall be removed from pool C, reset its score_poolA_valid and the counter for its score_poolA and sends a 'MAC_stop' flag to the prediction core. Either of the below conditions met:

When a UE exits TM7 mode (available for users in all pools).
When buffer_ready becomes false (available for users in all pools).
When there is a more suitable UE for prediction in the waiting list (available for users in pool C)

The associated actions for the above events are as follows:
a) If $UE_i$ is in pool C and any of the events happens:
  a. The UE selection module sends a 'MAC_stop' flag true to the prediction algorithm.
b) If $UE_i$ is in pool B\C,
  a. If exiting TM7 (no more SRS configured), the UE will be removed from all pools.

Waiting List Check

For every $T_{c1}$ interval (configurable, default 200 SRS period), the selection module decides if any UE in pool C should be replaced with UEs in pool B. This operation is only performed when the pool C is full. The checking procedure is as follows:

1) Find the UE in pool C with lowest score_poolB, denoted as UE k
2) Find the UE in pool B with highest score_poolB, denoted as UE p. If UE p's score_poolB is higher than UE k's score by a threshold delta_c (configurable, default 3), continue next steps; otherwise stop.
3) Decides if UE k has started
    a. If predStart flag is false for UE k, implying the UE has not started the prediction core. Set MAC_stop flag for this UE to remove it.
    b. If predStart flag is true for UE k, and if the flag is true for at least Tc2 interval (configurable, default 200 SRS period), Set MAC_stop flag for this UE. Otherwise no action is taken.

In one embodiment, the user selection is performed for single user MIMO (SU-MIMO). The metrics and procedure can be either the same or different as MU-MIMO.

In another embodiment, the metrics or features used to perform user selection can include quality-of-service (QoS), traffic type such as video chat, online gaming and CDRX (connected discontinuous reception) configuration. For example, for feature i, a mapping function i can be designed such that a quantity or score can be calculated:

$$score\_i = f\_i(feature\_i)$$

Then, the overall score is calculated as $$score = sum\_i(w\_i * score\_i)$$

where w_i can be some tunable weighting factor reflecting the important of a certain feature. In theory, w_i can also be absorbed into function f_i, but keeping it separately helps to decouple the problem so that each mapping function can only concern of how to effective map the feature into a quantity depending on this feature alone.

In another embodiment, instead of a 2-stage selection is performed, the selection can be performed in another 1-step or N-steps. For example, if 1-step selection is performed, all the selected features will be used to calculate a single score and then ranked the users will be selected from the top.

In one embodiment, the SRS configuration such as SRS periodicity, cyclic shift or frequency offset can be also adjusted according the user selection algorithm. For example, for users with a high score but the feature(s) related to mobility indicating the users are in high mobility, we may configure the users with SRS with short periodicity. For users with a low score and features(s) related to mobility indicating the users are in static or very low mobility, we may configure the users with SRS with long periodicity. In another example, for users with high score but SRS SINR is low, one may configure SRS with a different cyclic shift or frequency offset to avoid uplink interference and improve SINR.

In another embodiment, the derived features including eig-power radio and sample-hold cross correlation have multiple variations. For example, the calculation can be downsampled in either antenna domain, time domain or frequency domain or combination of any, which will help reduce complexity of calculating these metrics.

In one embodiment, the eig-power ratio can be derived differently. The key point is that the eig-power ratio will reflect how channel correlation matrix of antennas can vary according to time. In one variation, instead of using the ratio of the strongest N eigenvalues, one may explicitly use the eigenvalues themselves and define a certain power threshold to capture how many eigenvalues exceed such threshold as an indicator to judge if the spatial correlation is strong or weak. In another variation, the eigenvalue distribution or a certain function mapping can be used to map the set of eigenvalues to an indicator of spatial correlation.

In another embodiment, sample-hold cross correlation can be calculated using frequency hopped signals as well. For example, for a particular subband i, we calculate sample-hold cross correlation as:

$$shXcor\_i(p) = correlation(subband\_i(n), subband\_i(n-p))$$

where p=1 to P and P is the SRS time index that the SRS is transmitted on the same subband i. The overall correlation can be calculated:

$$shXcor\_i = sum(a\_ip * shXcor\_i(p))$$

where the coefficient a_ip is to weigh differently as the shXcor_i (p) will be reduced as the frequency gap between two subband will be different. The larger the frequency gap, the lower correlation is expected and thus the less weight shall be put on the value, as it is also distorted by frequency correlation.

In one embodiment, residue energy is scaled and added back to the prediction. The scale may be computed according to estimated SRS signal power and SRS SNR. Channel prediction may be bypassed when an invalid SRS is detected.

Figure 9:
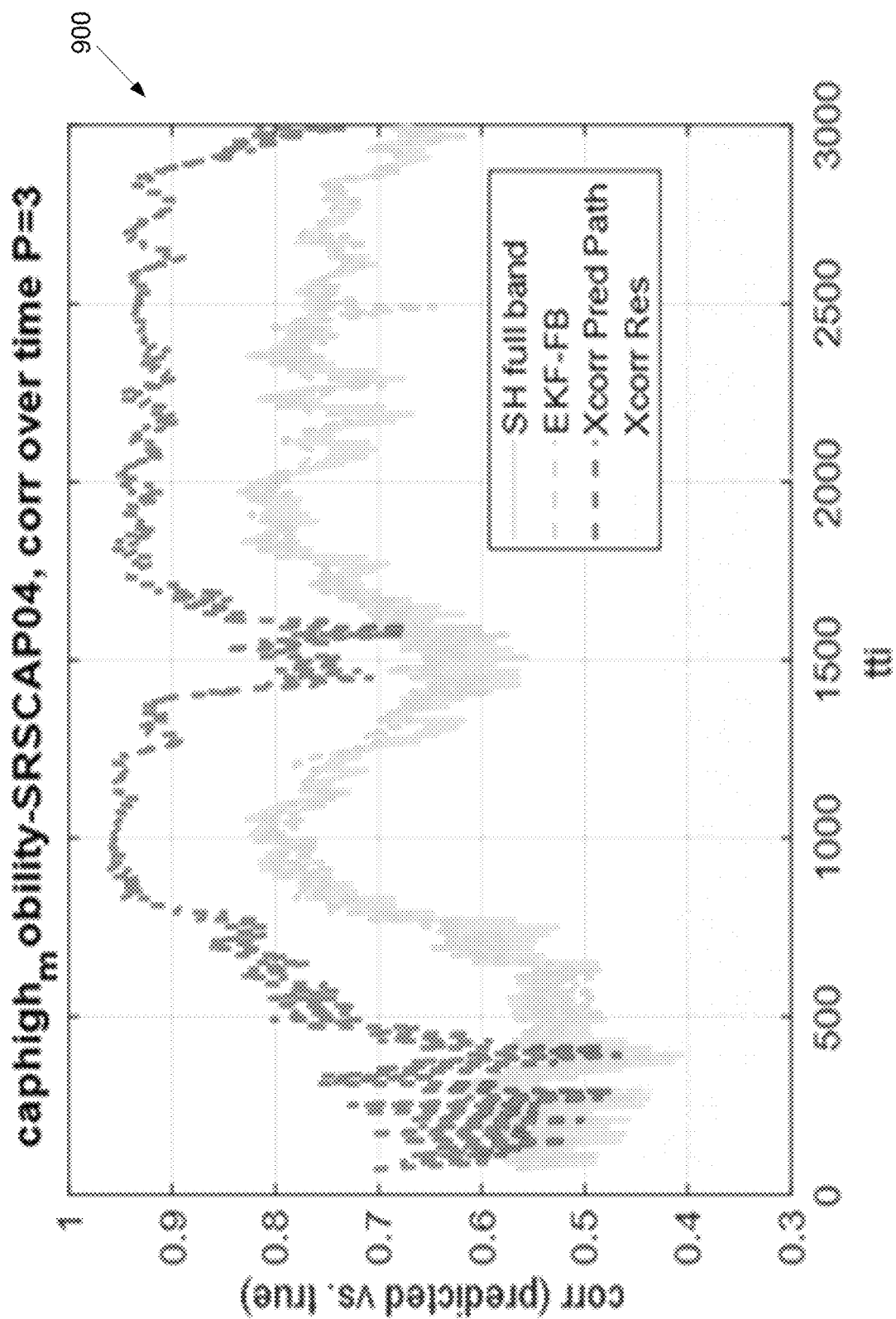
FIG. 9 illustrates an example of a graph of residue energy according to an embodiment of the present disclosure.

FIG. 9 illustrates an example of a graph of residue energy 900 according to an embodiment of the present disclosure. The embodiment of the graph of residue energy 900 illustrated in FIG. 9 is for illustration only. FIG. 9 does not limit the scope of this disclosure to any particular implementation of the graph of residue energy 900.

As illustrated in FIG. 9, when SRS SNR is low, adding residue back WITHOUT scaling can result to prediction cross correlation loss.

Figure 10:
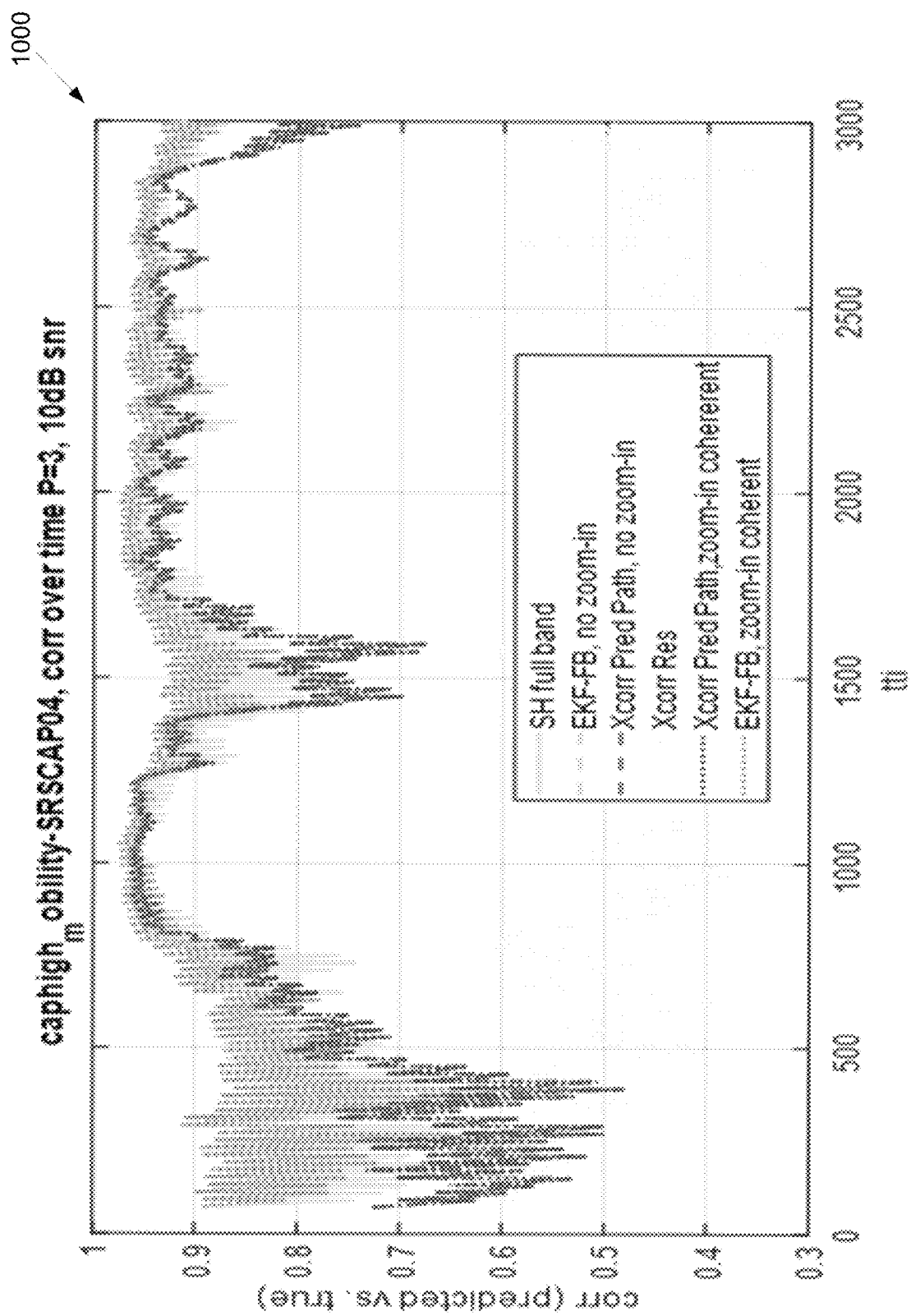
FIG. 10 illustrates an example of a graph of residue energy according to an embodiment of the present disclosure.

FIG. 10 illustrates an example of a graph of residue energy 1000 according to an embodiment of the present disclosure. The embodiment of the graph of residue energy 1000 illustrated in FIG. 10 is for illustration only. FIG. 10 does not limit the scope of this disclosure to any particular implementation of the graph of residue energy 1000.

As illustrated in FIG. 10, adding residue back WITH scaling can improve prediction cross correlation gain.

Path Management

There are cases when the channel condition has changed, or the number of estimated paths needs to be adjusted. For instance, when a UE moves around the corner such that previously tracked path parameters cannot well represent the new environment, or some paths need to be dropped to improve estimation stability, or the channel condition is not suitable to perform EKF parameter estimation.

Figure 11:
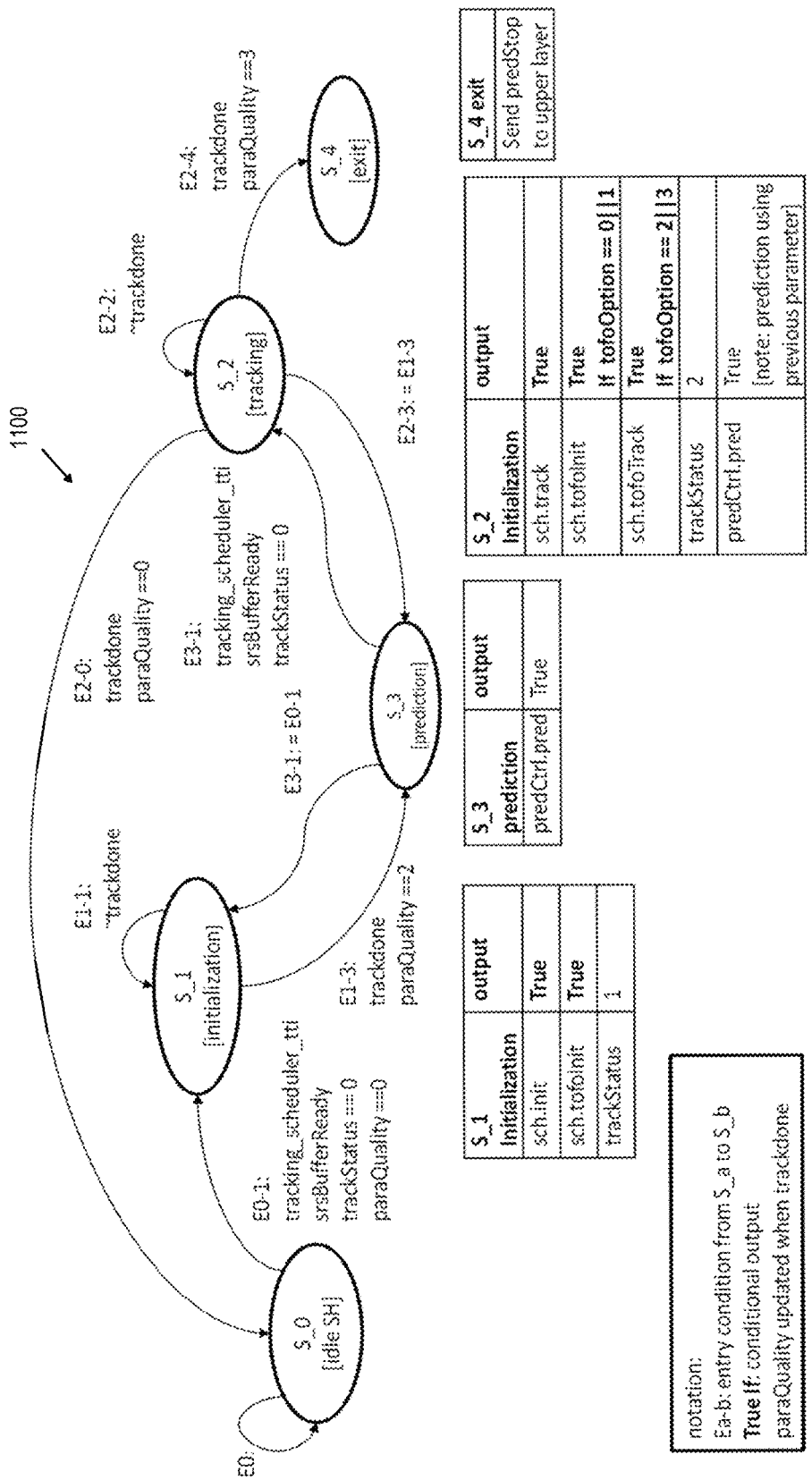
FIG. 11 illustrates an example path management control flow according to an embodiment of the present disclosure.

FIG. 11 illustrates an example path management control flow 1100 according to an embodiment of the present disclosure. The embodiment of the path management control flow 1100 illustrated in FIG. 11 is for illustration only. One or more of the components illustrated in FIG. 11 can be implemented in specialized circuitry configured to perform the noted functions or one or more of the components can be implemented by one or more processors executing instructions to perform the noted functions. FIG. 11 does not limit the scope of this disclosure to any particular implementation of the path management control flow 1100.

The path manager block will report the estimated channel parameter quality as one of the following four categories:

1) Abandon—the EKF parameter tracking shall not be applied to this UE;
2) ReInit—the channel parameters need to be re-inialized 3) Path dropped—certain path needs to be removed to improve estimation and prediction stability. In this scenario, the path parameter is also adjusted accordingly.
4) Usable—when the above situations do not happen, current channel parameters can be applied in channel prediction and tracking The above decision is made by performing the following four functionalities:
1) Decide if channel prediction should remove the existing UE
2) Decide if re-initialization needs to be performed
3) Decide if a path needs to be dropped due to it Doppler value is out of the range
4) Decide if there exists a pair of paths with close parameters, and if one path needs to be dropped Exit Decision In real field, some user's channel may become unfavorable for channel prediction, or they are wrongly admitted. It is desired to terminate the prediction operation for this user.

In one embodiment, the users' SH and prediction performance (SH Xcorr and preXcorr) is monitored for a period of time (lossObsWindow).

Similar to SH Xcorr, the predXcorr is computed as below $$predXcorr = E\left\{ \frac{|c_m b_m^H|}{|c_m|_2 |b_m|_2} \right\}$$

Here $c_m$ is the predicted channel for the $N_{srs}$ time instance.

$$c_m = \hat{y}_{:,m,N_{srs}}$$

$$b_m = y_{:,m,N_{srs}}$$

To avoid a ping-pong effect of the eigen value ratio, the IIR filtered value is used $$predXcorr_{avg,t} = \alpha predXcorr_t + (1-\alpha) predXcorr_{avg,t-1}$$

If the portion of time (lossTol) that prediction is worse than SH exceeds a threshold (gainThredB), this user shall exit the channel prediction algorithm. This block operates with a counter, predLossCounter. The output is predStop decision.

The pseudo code is as follows:

```
preSNR = log10(1./(1-preXcor)/2)
shSNR = log10(1./(1-shXcor)/2)
If preSNR - shSNR < gainThredB
    predLossCounter ++
end
if mod (srsTick, lossObsWindow) == 1
    if predLossCounter > lossTol
        predStop = true;
    end
    predLossCounter = 0;
end
```

In another embodiment, a classifier is trained to take computed channel statistics as input, and decides if the prediction is significant enough for the UE to remain inside the prediction core.

In addition to the statistics used in UE selection (SHXcorr, Eigen ratio, SRS SNR), the module can also use Doppler root-mean-square (RMS), delay RMS, and path power RMS as input to further characterize the channel. The RMS statistics can be computed using estimated parameter. For instance, the Doppler RMS is computed as $$\sigma_v = \sqrt{ \frac{\sum_{p=1\ldots P} v_p^2 \overline{|\gamma_p|^2}}{\sum_{p=1\ldots P} \overline{|\gamma_p|^2}} - \left( \frac{\sum_{p=1\ldots P} v_p \overline{|\gamma_p|^2}}{\sum_{p=1\ldots P} \overline{|\gamma_p|^2}} \right)^2 },$$

where $v_p$ is the estimated Doppler of path p, and $\overline{|\gamma_p|^2}$ is the estimated per-path power. One method to calculate path-power is averaging estimated y of path p on all antennas, i.e.

$$\overline{|\gamma_p|^2} = \frac{1}{K} \sum_{k=1\ldots K} |\gamma_{p,k}|^2.$$

To avoid fast fluctuating Doppler RMS, a filtered version is used:

$$\sigma_{v,avg} = \alpha \sigma_{v,t} + (1-\alpha) \sigma_{v,avg}$$

When one of the exit decision embodiments discussed above (e.g., 1. compare the estimated SH Xcorr and predXcorr, and decide if the UE shall be removed; 2. use computed Doppler RMS from estimated parameters to decide if the UE shall be removed (the thresholds depend on SRS periodicity); 3. use a trained classifier to decide if the UE shall be removed), decides that a UE shall be removed from the prediction core, the action is taken.

Figure 12:
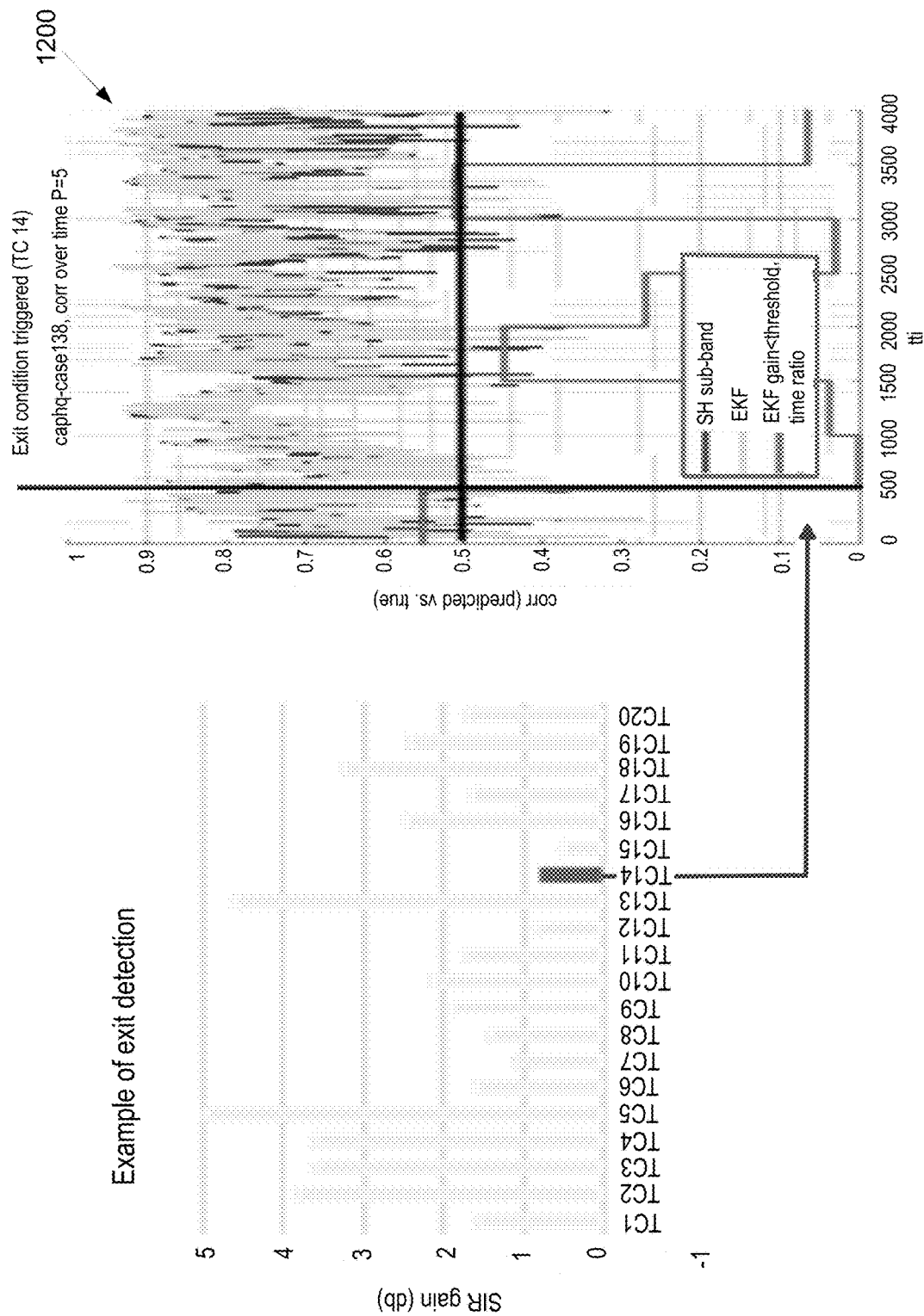
FIG. 12 illustrates an example of comparing the estimated sample-hold and prediction correlation and prediction performance according to embodiments of the present disclosure.

FIG. 12 illustrates an example of comparing the estimated SH Xcorr and predXcorr 1200 according to an embodiment of the present disclosure. The embodiment of the comparing the estimated SH Xcorr and predXcorr 1200 illustrated in FIG. 12 is for illustration only. FIG. 12 does not limit the scope of this disclosure to any particular implementation of the comparing the estimated SH Xcorr and predXcorr 1200.

As shown in FIG. 12, comparison of the estimated SH Xcorr and predXcorr can remove UEs achieving smaller performance gain, thereby sparing more resources for other UEs. The comparison illustrated in FIG. 12 was generated using 20 SRS captures from deployed commercial BSs.

Figure 13:
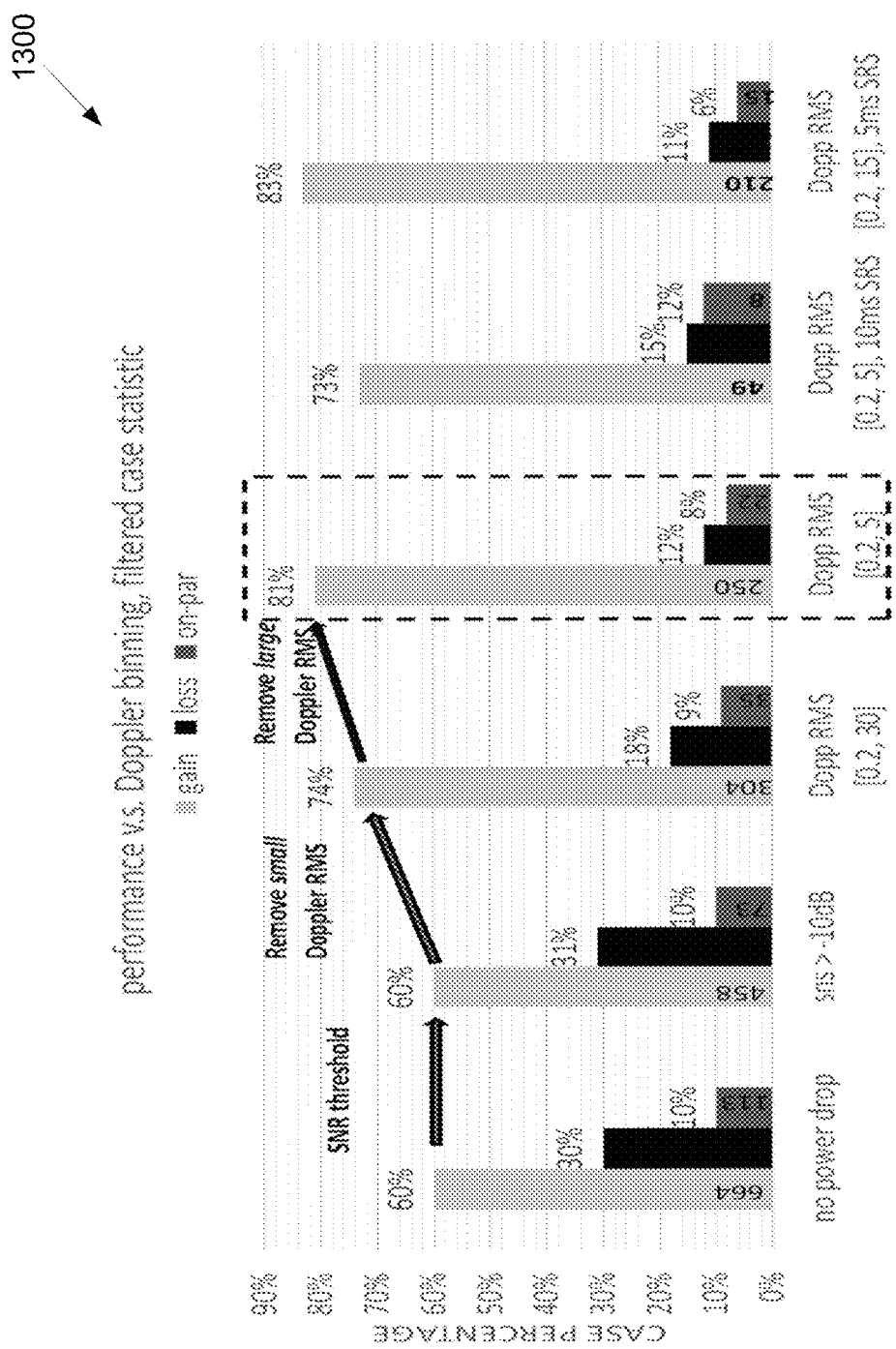
FIG. 13 illustrates an example of using computed Doppler RMS according to an embodiment of the present disclosure.

FIG. 13 illustrates an example of using computed Doppler RMS 1300 according to an embodiment of the present disclosure. The embodiment of using computed Doppler RMS 1300 illustrated in FIG. 13 is for illustration only. FIG. 13 does not limit the scope of this disclosure to any particular implementation of using computed Doppler RMS 1300.

As shown in FIG. 13, Doppler binning helps to remove the UEs with prediction loss. When $\sigma_{threshold,1} < \sigma_v < \sigma_{threshold,2}$, the UEs are most likely to benefit from the prediction algorithm. The Doppler binning illustrated in FIG. 13 was generated using 1700 SRS logs from deployed commercial BSs.

Figure 14:
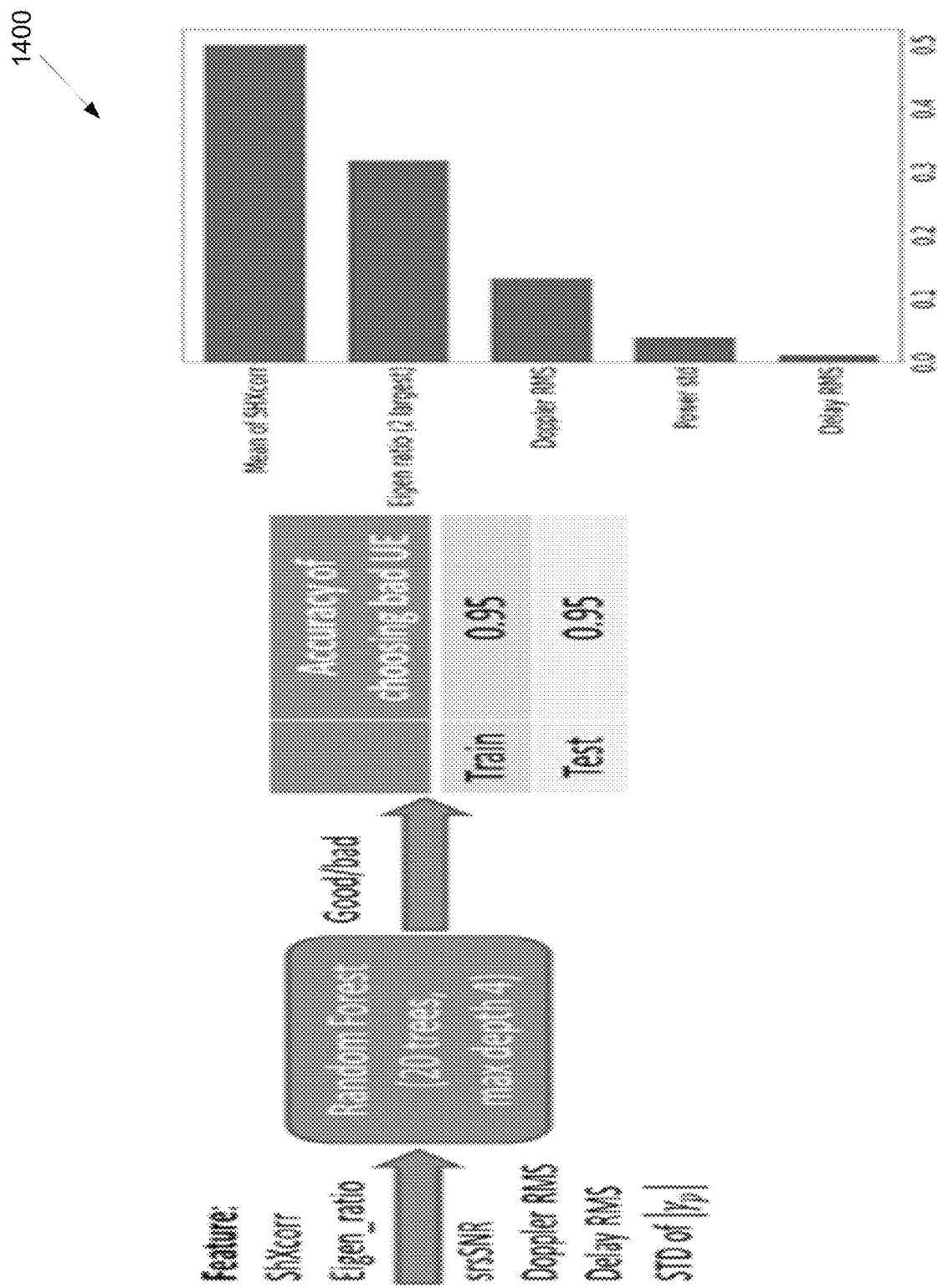
FIG. 14 illustrates an example of using a classifier according to an embodiment of the present disclosure.

FIG. 14 illustrates an example of using a classifier 1400 according to an embodiment of the present disclosure. The embodiment of using a classifier 1400 illustrated in FIG. 14 is for illustration only. FIG. 14 does not limit the scope of this disclosure to any particular implementation of using a classifier 1400.

As shown in FIG. 14, a classifier can help to accurately detect bad UEs. The classifier illustrated in FIG. 14 was generated using 11400 channels from system level simulation.

Re-Initialization

In one embodiment, if the current set of channel parameters cannot well capture the channel, re-initialization may be performed. The metric adopted is the filtered residue error ratio (shResErrRatio). When the residue error ratio is larger than a threshold (resPowThre_add) for a period of time (addPathCounter_thre), the block will decide that the parameter cannot well represent the channel, and asserts the 're-initialization' decision (reInit).

This block includes a counter (addPathCounter), a threshold for residue error ratio (resPowThre_add), and a threshold for counter time (addPathCounter_thre). The pseudo code is as follows:

```
if shResErrRatio >= resPowThre_add;
        addPathCounter ++
else
        addPathCounter = 0
end
if addPathCounter>= addPathCounter_thre
        reInt = true;
end
```

Drop Path

A path shall be dropped if any of the below two scenarios occur:
1) A path has estimated parameter that's out of the reliable estimation range of the algorithm. In particular, when a path shows exceptionally large Doppler, it can be deemed as an unreliable path.
2) A path has similar parameters with another path. This will occur when more paths are estimated than required, some paths may evolve to have close delay and Doppler parameter. When this happens, it is desired to remove the duplicate path to improve algorithm stability.

The operation of dropping large Doppler path's decision involves a predefined Doppler range, and operates after the above re-inialization decision block. When re-initialization (reInit) is not required, if any path's Doppler value exceeds a predefined threshold (DopplerMax_Hz), the path shall be dropped.

The output is the path_to_drop. The pseudo code is as follows:

```
If (~reInt)
        Path_to_drop = find( estpar.nu > DopplerMax_thre)
End
```

The module of merging close paths is operated if the path parameters do not need to be re-initialized and no large Doppler path needs to be dropped, and the number of paths is greater than the minimal required path number (minPath).

In one embodiment, the path manager drops the path that has parameter(s) exceeding a predefined range of operation.

When a pair of paths show similar estimated parameter(s) for a predefined period of time, the one with weaker amplitude is dropped. The path manager first monitors if there is one pair of close paths (closePathPair). If a close pair is identified (the parameter distance is less than dTheta, predefine delay and Doppler distance threshold), monitor the pair for a period of time (use a counter dropPathCounter). If it is confirmed that the pair always have close parameters (for dropPathCounter_thre counts), the path with weaker strength is dropped. If the pair do not always have close parameters during the monitoring window, the decision will stop monitoring them and identify if there exists another pair.

Figure 15:
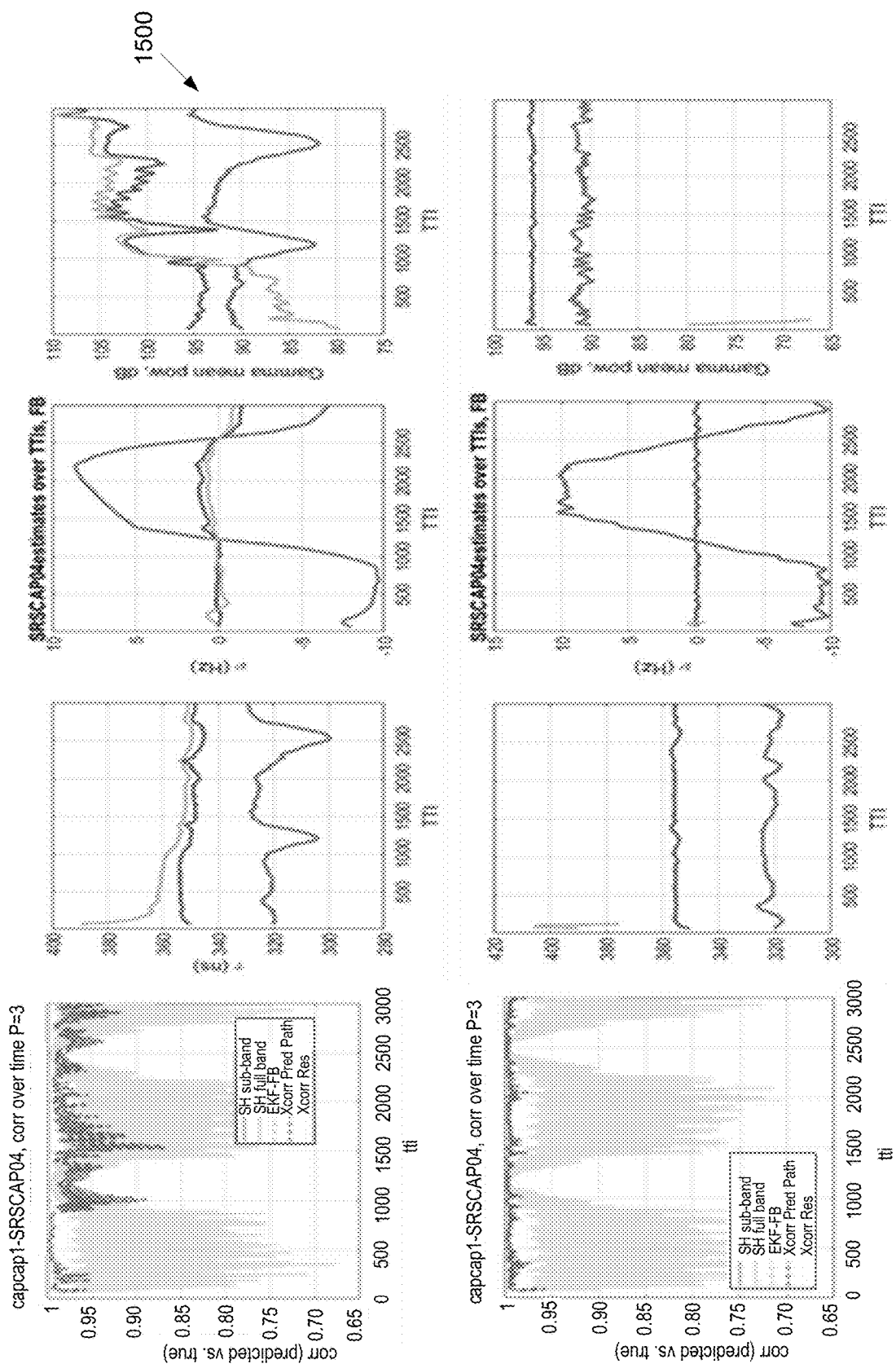
FIG. 15 illustrates an example of path dropping according to an embodiment of the present disclosure.

FIG. 15 illustrates an example of path dropping 1500 according to an embodiment of the present disclosure. The embodiment of using path dropping 1500 illustrated in FIG. 15 is for illustration only. FIG. 15 does not limit the scope of this disclosure to any particular implementation of using the path dropping 1500.

As shown in FIG. 15, when 3 paths are estimated for a 2-path channel, dropping a path helps to stabilize parameter estimation and improves prediction gain. The upper portion of FIG. 15 shows three paths being estimated. The lower portion of FIG. 15 shows three paths being estimated and using a path merging module to drop one of the three paths. The data used in generating FIG. 15 is from anechoic chamber measurement.

Parameter Adjustment and Reset Counters

The output status shall be adjusted according to the above decision blocks.

If there is non-zero path_to_drop, the output of the path manager, pathDropped, shall be set to true.

The path parameters (estpar) and the EKF covariance matrix should remove the parameters of the dropped path.

The operation is described in function adjust_estPar.m.

```
If re-initialization or pathDropped decision was made, the
re-initialization and path dropping counters shall all be reset.
    if pathDropped || reInt || abandon
        addPathCounter = 0; % reset residue add path counter, need to
                             re-stabilize
        dropPathCounter = 0; % reset all path-Dropping counters
        closePathPair = [ ];
    end
```

The parameter quality (paraQuality) is also judged in update_para_status module, according to path manager's output:

```
if predStop
        paraQuality = 3;
    %, indicating the message should be sent to upper layer to terminate this user.
        elseif reInt
            paraQuality = 0;
                % indicating the current parameters cannot be tracked in the next srs snapshot
        elseif pathDropped
            paraQuality = 1;
                % indicating delay-Doppler tracking can continue, while gamma tracking needs to
                  be configured as LS estimation
        else
            paraQuality = 2;
                %indicating in next snapshot the parameter tracking can operate as normal.
    end
```

Any of the above variation embodiments can be utilized independently or in combination with at least one other variation embodiment.

Figure 16:
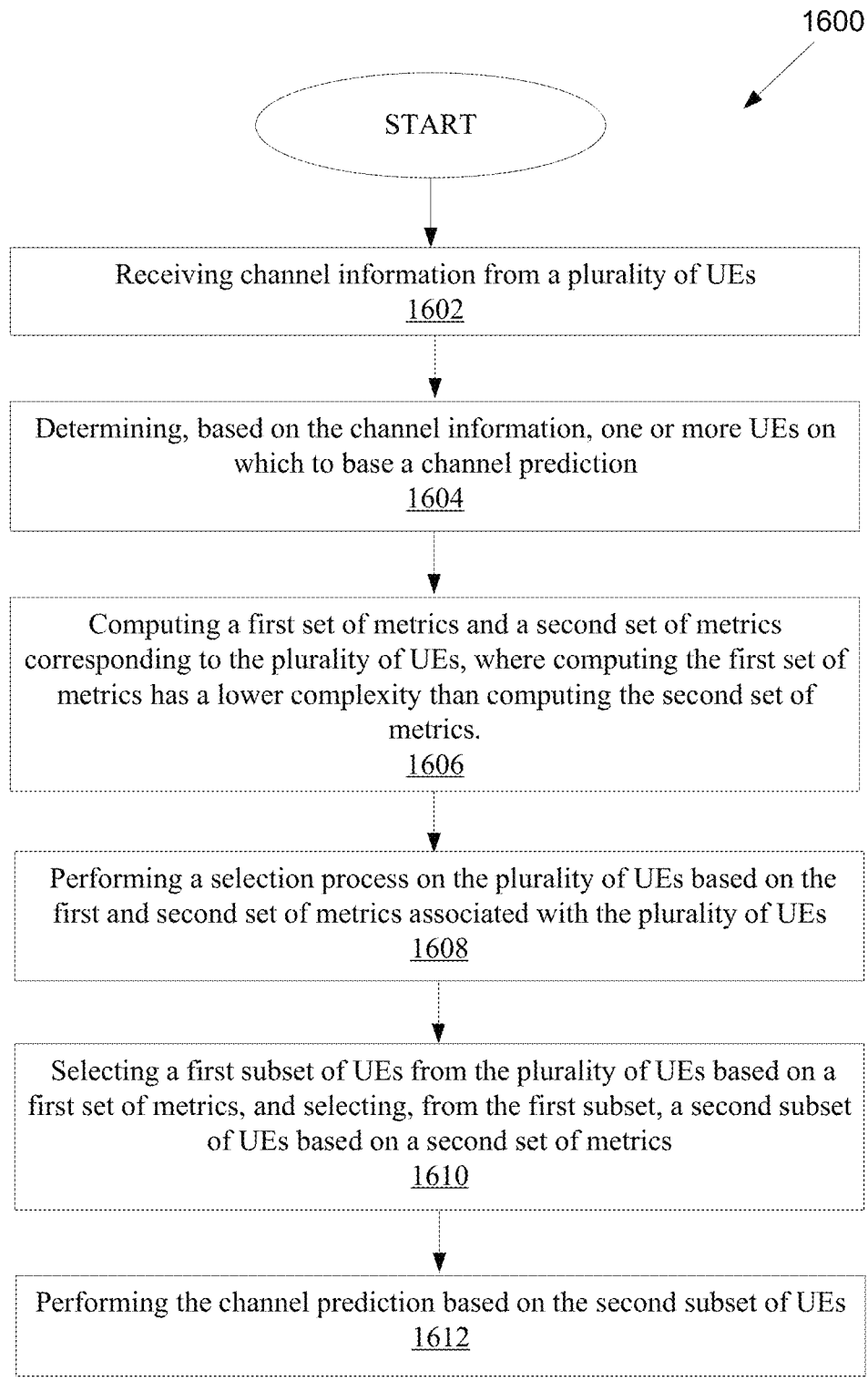
FIG. 16 illustrates a flow chart of a method for determining one or more UEs on which to base a channel prediction on, as may be performed by a base station, according to embodiments of the present disclosure.

FIG. 16 illustrates a flow chart of a method 1800, as may be performed by a base station (BS) such as BS 102, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the BS (e.g., 101-103 as illustrated in FIG. 1), receives channel information from a plurality of UEs.

In step 1604, the BS determines, based on the channel information, one or more UEs on which to base a channel prediction.

In step 1606, the BS computes a first set of metrics and a second set of metrics corresponding to the plurality of UEs, where computing the first set of metrics has a lower complexity than computing the second set of metrics.

In step 1608, the BS performs a selection process on the plurality of UEs based on the first and second set of metrics associated with the plurality of UEs.

In step 1610, the BS selects a first subset of UEs from the plurality of UEs based on a first set of metrics, and selects, from the first subset, a second subset of UEs based on a second set of metrics.

In step 1612, the BS performs the channel prediction based on the second subset of UEs.

In one embodiment, the channel information comprises one or more of sounding reference signal (SRS), channel quality indicator (CQI), and quality of service (QoS); the first set of metrics comprises sounding reference signal to interference plus noise ratio (SRS SINR) and buffer occupancy (BO) metrics of the UEs, respectively; and the second set of metrics comprises: eigen power ratios that correspond to a ratio of dominant eigen values of a channel spatial covariance matrix to total channel power of the UEs, respectively, for the UEs in the first subset, and sample and hold correlations that correspond to a channel's time domain correlation of the UEs, respectively, for the UEs in the first subset.

In one embodiment, to determine which UEs to base a channel prediction on, the processor is further configured to: dynamically adjust which UEs to perform channel prediction on based on changes in the channel information, such that the processor is configured to add, remove, or replace a UE selected based on the first metric or a UE selected based on the second metric.

In one embodiment, to determine which UEs to base a channel prediction on, the processor is further configured to: compute a score corresponding to the first and second set of metrics, related to the plurality of UEs, respectively; and select the one or more UEs from the plurality of UEs based on the scores.

In one embodiment, to compute the score corresponding to the first set of metrics, the processor is further configured to: determine a weighted sum of scores for each metric in the first subset, wherein: a score awarded for a sounding reference signal to interference plus noise ratio (SRS SINR) value being within a predefined range is higher than a score awarded for an SRS SINR value being outside of the predefined range, and a score awarded for a buffer occupancy (BO) value being above a threshold is higher than a score awarded for a BO value being below the threshold, wherein scores awarded for values of BO being below the threshold decrease proportionally based on decreasing values of BO, respectively.

In one embodiment, to compute the score corresponding to the second set of metrics, the processor is further configured to: determine a weighted sum of scores for each metric in the second subset plus the score from the first subset, wherein: a score awarded for a sample-and-hold cross correlation value being within a predefined range is higher than a score awarded for a sample-and-hold cross correlation value being outside of the predefined range, and a score awarded for an eigen power ratio is based on a value of the eigen power ratio, wherein a higher score is awarded for a higher value of the eigen power ratio.

In one embodiment, to replace a UE in the second subset, the processor is further configured to: compare a sample and hold correlation that corresponds to a channel's time domain correlation of the UE in the second subset to a prediction correlation for a same time interval, the prediction correlation corresponding to a correlation between a predicted channel and received SRS; and in response to the prediction correlation being less than the sample and hold correlation, replace the UE in the second subset.

In one embodiment, to replace a UE in the second subset, the processor is further configured to: compare computed Doppler root mean square (RMS) values from estimated parameters to threshold values of the UE in the second subset; and in response to the Doppler RMS values being less than the threshold values, replace the UE in the second subset.

In one embodiment, to modify one or more path parameters associated with a path of a UE in the second subset, the processor is further configured to: in response to one or more path parameters associated with estimated channel parameters of the UEs in the second subset having the one or more path parameters exceeding a threshold, drop the path.

In one embodiment, to modify one or more path parameters associated with a pair of paths of a UE in the second subset, the processor is further configured to: in response to one or more path parameters associated with estimated channel parameters of the UEs in the second subset having similar estimated parameters over a same period of time, drop a path of the pair of paths that has lower path power.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) comprising: a transceiver configured to receive channel information from a plurality of UEs; and a processor operably connected to the transceiver, the processor configured to: determine, based on the channel information, one or more UEs on which to base a channel prediction on by:
computing a first set of metrics and a second set of metrics corresponding to the plurality of UEs, wherein computing the first set of metrics has a lower complexity than computing the second set of metrics;
performing a selection process on the plurality of UEs based on the first and second set of metrics associated with the plurality of UEs, wherein to perform the selection process, the processor is configured to:

select a first subset of UEs from the plurality of UEs based on the first set of metrics, select, from the first subset, a second subset of UEs based on the second set of metrics, and perform the channel prediction based on the second subset of UEs.

2. The BS of claim 1, wherein:

the channel information comprises one or more of sounding reference signal (SRS), channel quality indicator (CQI), and quality of service (QoS); the first set of metrics comprises sounding reference signal to interference plus noise ratio (SRS SINR) and buffer occupancy (BO) metrics of the UEs, respectively; and the second set of metrics comprises:

eigen power ratios that correspond to a ratio of dominant eigen values of a channel spatial covariance matrix to total channel power of the UEs, respectively, for the UEs in the first subset, and sample and hold correlations that correspond to a channel's time domain correlation of the UEs, respectively, for the UEs in the first subset.

3. The BS of claim 1, wherein to determine which UEs to base a channel prediction on, the processor is further configured to:

dynamically adjust which UEs to perform channel prediction on based on changes in the channel information, such that the processor is configured to add, remove, or replace a UE selected based on the first metric or a UE selected based on the second metric.

4. The BS of claim 1, wherein to determine which UEs to base a channel prediction on, the processor is further configured to:

compute a score corresponding to the first and second set of metrics, related to the plurality of UEs, respectively; and select the one or more UEs from the plurality of UEs based on the scores.

5. The BS of claim 4, wherein to compute the score corresponding to the first set of metrics, the processor is further configured to:

determine a weighted sum of scores for each metric in the first subset, wherein:

a score awarded for a sounding reference signal to interference plus noise ratio (SRS SINR) value being within a predefined range is higher than a score awarded for an SRS SINR value being outside of the predefined range, and a score awarded for a buffer occupancy (BO) value being above a threshold is higher than a score awarded for a BO value being below the threshold, wherein scores awarded for values of BO being below the threshold decrease proportionally based on decreasing values of BO, respectively.

6. The BS of claim 4, wherein to compute the score corresponding to the second set of metrics, the processor is further configured to:

determine a weighted sum of scores for each metric in the second subset plus the score from the first subset, wherein:

a score awarded for a sample-and-hold cross correlation value being within a predefined range is higher than a score awarded for a sample-and-hold cross correlation value being outside of the predefined range, and a score awarded for an eigen power ratio is based on a value of the eigen power ratio, wherein a higher score is awarded for a higher value of the eigen power ratio.

7. The BS of claim 3, wherein to replace a UE in the second subset, the processor is further configured to:

compare a sample and hold correlation that corresponds to a channel's time domain correlation of the UE in the second subset to a prediction correlation for a same time interval, the prediction correlation corresponding to a correlation between a predicted channel and received SRS; and in response to the prediction correlation being less than the sample and hold correlation, replace the UE in the second subset.

8. The BS of claim 3, wherein to replace a UE in the second subset, the processor is further configured to:

compare computed Doppler root mean square (RMS) values from estimated parameters to threshold values of the UE in the second subset; and in response to the Doppler RMS values being less than the threshold values, replace the UE in the second subset.

9. The BS of claim 3, wherein to modify one or more path parameters associated with a path of a UE in the second subset, the processor is further configured to:

in response to one or more path parameters associated with estimated channel parameters of the UEs in the second subset having the one or more path parameters exceeding a threshold, drop the path.

10. The BS of claim 3, wherein to modify one or more path parameters associated with a pair of paths of a UE in the second subset, the processor is further configured to:

in response to one or more path parameters associated with estimated channel parameters of the UEs in the second subset having similar estimated parameters over a same period of time, drop a path of the pair of paths that has lower path power.

11. A method for operating a base station (BS), the method comprising:

receiving channel information from a plurality of UEs;

determining, based on the channel information, one or more UEs on which to base a channel prediction;

computing a first set of metrics and a second set of metrics corresponding to the plurality of UEs, wherein computing the first set of metrics has a lower complexity than computing the second set of metrics;

performing a selection process on the plurality of UEs based on the first and second set of metrics associated with the plurality of UEs;

selecting a first subset of UEs from the plurality of UEs based on the first set of metrics;

selecting, from the first subset, a second subset of UEs based on the second set of metrics; and performing the channel prediction based on the second subset of UEs.

12. The method of claim 11, wherein:

the channel information comprises one or more of sounding reference signal (SRS), channel quality indicator (CQI), and quality of service (QoS); the first set of metrics comprises sounding reference signal to interference plus noise ratio (SRS SINR) and buffer occupancy (BO) metrics of the UEs, respectively; and the second set of metrics comprises:

eigen power ratios that correspond to a ratio of dominant eigen values of a channel spatial covariance matrix to total channel power of the UEs, respectively, for the UEs in the first subset, and sample and hold correlations that correspond to a channel's time domain correlation of the UEs, respectively, for the UEs in the first subset.

13. The method of claim 11, wherein determining which UEs to base a channel prediction on comprises:
   dynamically adjusting which UEs to perform channel prediction on based on changes in the channel information; and
   adding, removing, or replacing a UE selected based on the first metric or a UE selected based on the second metric.

14. The method of claim 11, wherein determining which UEs to base a channel prediction on comprises:
   computing a score corresponding to the first and second set of metrics, related to the plurality of UEs, respectively; and
   selecting the one or more UEs from the plurality of UEs based on the scores.

15. The method of claim 14, wherein computing the score corresponding to the first set of metrics comprises:
   determining a weighted sum of scores for each metric in the first subset, wherein:
      a score awarded for a sounding reference signal to interference plus noise ratio (SRS SINR) value being within a predefined range is higher than a score awarded for an SRS SINR value being outside of the predefined range, and
      a score awarded for a buffer occupancy (BO) value being above a threshold is higher than a score awarded for a BO value being below the threshold, wherein scores awarded for values of BO being below the threshold decrease proportionally based on decreasing values of BO, respectively.

16. The method of claim 14, wherein computing the score corresponding to the second set of metrics comprises:
   determining a weighted sum of scores for each metric in the second subset plus the score from the first subset, wherein:
      a score awarded for a sample-and-hold cross correlation value being within a predefined range is higher than a score awarded for a sample-and-hold cross correlation value being outside of the predefined range, and
      a score awarded for an eigen power ratio is based on a value of the eigen power ratio, wherein a higher score is awarded for a higher value of the eigen power ratio.

17. The method of claim 13, wherein replacing a UE in the second subset comprises:
   comparing a sample and hold correlation that corresponds to a channel's time domain correlation of the UE in the second subset to a prediction correlation for a same time interval, the prediction correlation corresponding to a correlation between a predicted channel and received SRS; and
   in response to the prediction correlation being less than the sample and hold correlation, replacing the UE in the second subset.

18. The method of claim 13, wherein replacing a UE in the second subset comprises:
   comparing computed Doppler root mean square (RMS) values from estimated parameters to threshold values of the UE in the second subset; and
   in response to the Doppler RMS values being less than the threshold values, replacing the UE in the second subset.

19. The method of claim 13, wherein modifying one or more path parameters associated with a path of a UE in the second subset comprises:
   in response to one or more path parameters associated with estimated channel parameters of the UEs in the second subset having the one or more path parameters exceeding a threshold, dropping the path.

20. The method of claim 13, wherein modifying one or more path parameters associated with a pair of paths of a UE in the second subset comprises:
   in response to one or more path parameters associated with estimated channel parameters of the UEs in the second subset having similar estimated parameters over a same period of time, dropping a path of the pair of paths that has lower path power.

* * * * *